United States Patent
Hara et al.

(10) Patent No.: US 12,504,838 B2
(45) Date of Patent: *Dec. 23, 2025

(54) ACTIVE STYLUS

(71) Applicant: Wacom Co., Ltd., Saitama (JP)

(72) Inventors: Hideyuki Hara, Tokyo (JP); Nobutaka Ide, Tokyo (JP); Yasuo Oda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/890,376

(22) Filed: Sep. 19, 2024

(65) Prior Publication Data
US 2025/0013324 A1    Jan. 9, 2025

Related U.S. Application Data

(63) Continuation of application No. 17/486,527, filed on Sep. 27, 2021, now Pat. No. 12,124,642, which is a
(Continued)

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *G06F 3/0416* (2013.01);
(Continued)

(58) Field of Classification Search
CPC ....... G06F 2203/04102; G06F 3/03545; G06F 3/0383; G06F 3/041; G06F 3/0412;
(Continued)

(56) References Cited

U.S. PATENT DOCUMENTS

| 4,430,526 A | 2/1984 | Brown et al. |
| 4,672,154 A | 6/1987 | Rodgers et al. |

(Continued)

FOREIGN PATENT DOCUMENTS

| CN | 102109923 A | 6/2011 |
| JP | H07104908 A | 4/1995 |

(Continued)

OTHER PUBLICATIONS

International Search Report, dated Aug. 2, 2016, for International Application No. PCT/JP2016/064965. (3 pages) (with English translation).

(Continued)

*Primary Examiner* — Michael J Jansen, II
(74) *Attorney, Agent, or Firm* — Seed Intellectual Property Law Group LLP

(57) ABSTRACT

An active stylus includes at least one electrode, and an integrated circuit coupled to the at least one electrode. The integrated circuit is configured to: operate in a first mode to unilaterally transmit signals to a sensor controller from one of the at least one electrode; determine whether a pen tip of the active stylus is in contact with a sensor panel; responsive to determining that the pen tip is in contact with the sensor panel, transmit a pen pressure value of the pen tip; and responsive to determining that the pen tip is not in contact with the sensor panel, instead of transmitting the pen pressure value, detect an uplink signal transmitted from the sensor panel.

18 Claims, 14 Drawing Sheets

Related U.S. Application Data continuation of application No. 17/135,781, filed on Dec. 28, 2020, now Pat. No. 11,132,074, which is a continuation of application No. 16/723,660, filed on Dec. 20, 2019, now Pat. No. 10,877,580, which is a continuation of application No. 16/557,008, filed on Aug. 30, 2019, now Pat. No. 10,514,785, which is a continuation of application No. 15/792,187, filed on Oct. 24, 2017, now Pat. No. 10,401,985, which is a continuation of application No. PCT/JP2016/064965, filed on May 20, 2016.

(60) Provisional application No. 62/164,859, filed on May 21, 2015.

(51) Int. Cl.
*G06F 3/041* (2006.01)
*G06F 3/044* (2006.01)

(52) U.S. Cl.
CPC .......... *G06F 3/04162* (2019.05); *G06F 3/044* (2013.01); *G06F 3/0441* (2019.05); *G06F 3/0442* (2019.05)

(58) Field of Classification Search
CPC ...... G06F 3/0414; G06F 3/0416; G06F 3/044; G06F 3/0441; G06F 3/0442; G06F 3/046
See application file for complete search history.

(56) References Cited

U.S. PATENT DOCUMENTS

| | | |
|---|---|---|
| 4,704,501 A | 11/1987 | Taguchi et al. |
| 4,786,765 A | 11/1988 | Yamanami et al. |
| 4,848,496 A | 7/1989 | Murakami et al. |
| 4,988,837 A | 1/1991 | Murakami et al. |
| 4,999,461 A | 3/1991 | Murakami et al. |
| 5,028,745 A | 7/1991 | Yamanami et al. |
| RE34,187 E | 3/1993 | Yamanami et al. |
| 5,191,175 A | 3/1993 | Protheroe et al. |
| 5,414,227 A | 5/1995 | Schubert et al. |
| 5,420,379 A | 5/1995 | Zank et al. |
| 5,475,401 A | 12/1995 | Verrier et al. |
| 5,495,077 A | 2/1996 | Miller et al. |
| 5,528,002 A | 6/1996 | Katabami |
| 5,543,588 A | 8/1996 | Bisset et al. |
| 5,554,828 A | 9/1996 | Primm |
| 5,567,920 A | 10/1996 | Watanabe et al. |
| 5,571,997 A | 11/1996 | Gray et al. |
| 5,600,105 A | 2/1997 | Fukuzaki et al. |
| 5,619,431 A | 4/1997 | Oda |
| 5,631,666 A | 5/1997 | Tagawa et al. |
| 5,644,108 A | 7/1997 | Katsurahira et al. |
| 5,646,377 A | 7/1997 | Oda |
| 5,654,529 A | 8/1997 | Yeung et al. |
| 5,661,269 A | 8/1997 | Fukuzaki et al. |
| 5,672,852 A | 9/1997 | Fukuzaki et al. |
| 5,675,130 A | 10/1997 | Sekizawa |
| 5,679,930 A | 10/1997 | Katsurahira |
| 5,682,019 A | 10/1997 | Katsurahira et al. |
| 5,699,084 A | 12/1997 | Fukuzaki |
| 5,706,000 A | 1/1998 | Fukuzaki et al. |
| 5,714,984 A | 2/1998 | Fukuzaki et al. |
| 5,729,251 A | 3/1998 | Nakashima |
| 5,736,980 A | 4/1998 | Iguchi et al. |
| 5,754,036 A | 5/1998 | Walker |
| 5,774,571 A | 6/1998 | Marshall |
| 5,844,548 A | 12/1998 | Chen et al. |
| 5,854,448 A | 12/1998 | Nozaki et al. |
| 5,854,881 A | 12/1998 | Yoshida et al. |
| 5,877,752 A | 3/1999 | Puthuff et al. |
| 5,898,136 A | 4/1999 | Katsurahira |
| 5,902,968 A | 5/1999 | Sato et al. |
| 5,969,296 A | 10/1999 | Yamamoto et al. |
| 5,977,958 A | 11/1999 | Baron et al. |
| 5,977,959 A | 11/1999 | Katsurahira et al. |
| 6,005,200 A | 12/1999 | Stanchak et al. |
| 6,005,555 A | 12/1999 | Katsurahira et al. |
| 6,188,392 B1 | 2/2001 | O'Connor et al. |
| 6,239,789 B1 | 5/2001 | Sekizawa et al. |
| 6,249,234 B1 | 6/2001 | Ely et al. |
| 6,259,438 B1 | 7/2001 | Fleck et al. |
| 6,417,846 B1 | 7/2002 | Lee |
| 6,489,899 B1 | 12/2002 | Ely et al. |
| 6,556,190 B2 | 4/2003 | Fleck et al. |
| 6,577,299 B1 | 6/2003 | Schiller et al. |
| 6,633,280 B1 | 10/2003 | Matsumoto et al. |
| 6,634,560 B1 | 10/2003 | Grabau |
| 6,639,585 B1 | 10/2003 | Nagai et al. |
| 6,667,740 B2 | 12/2003 | Ely et al. |
| 6,744,426 B1 | 6/2004 | Okamoto et al. |
| 6,784,876 B1 | 8/2004 | Nagai et al. |
| 6,801,192 B2 | 10/2004 | Fujitsuka et al. |
| 6,810,351 B2 | 10/2004 | Katsurahira |
| 6,904,405 B2 | 6/2005 | Suominen |
| 6,909,426 B2 | 6/2005 | Chao et al. |
| 6,930,674 B2 | 8/2005 | Katsurahira |
| 6,937,231 B2 | 8/2005 | Fujitsuka et al. |
| 6,952,201 B2 | 10/2005 | Fukushima et al. |
| 7,005,843 B2 | 2/2006 | Matsubara |
| 7,019,672 B2 | 3/2006 | Ely |
| 7,030,782 B2 | 4/2006 | Ely et al. |
| 7,082,213 B2 | 7/2006 | Black |
| 7,102,628 B2 | 9/2006 | LeKuch et al. |
| 7,113,087 B1 | 9/2006 | Casebolt et al. |
| 7,149,647 B2 | 12/2006 | Katsurahira |
| 7,176,907 B2 | 2/2007 | Chao et al. |
| 7,210,046 B2 | 4/2007 | Truong |
| 7,279,646 B2 | 10/2007 | Xu |
| 7,348,968 B2 | 3/2008 | Dawson |
| 7,406,393 B2 | 7/2008 | Ely et al. |
| 7,423,629 B2 | 9/2008 | Oda et al. |
| 7,424,154 B2 | 9/2008 | Seto et al. |
| 7,474,300 B2 | 1/2009 | Katsurahira et al. |
| 7,483,018 B2 | 1/2009 | Oliver |
| 7,511,705 B2 | 3/2009 | Silk et al. |
| 7,526,737 B2 | 4/2009 | Simmons et al. |
| 7,609,862 B2 | 10/2009 | Black |
| 7,646,379 B1 | 1/2010 | Drennan et al. |
| 7,656,390 B2 | 2/2010 | Oda |
| 7,675,507 B2 | 3/2010 | Oda et al. |
| 7,812,268 B2 | 10/2010 | Ely |
| 7,825,913 B2 | 11/2010 | Solomon et al. |
| 7,843,438 B2 | 11/2010 | Onoda |
| 7,868,873 B2 | 1/2011 | Palay et al. |
| 7,877,111 B2 | 1/2011 | Silverbrook et al. |
| 7,903,094 B2 | 3/2011 | Katsuhito et al. |
| 7,907,130 B2 | 3/2011 | Ely |
| 7,936,343 B2 | 5/2011 | Lapstun et al. |
| 7,961,917 B2 | 6/2011 | Black |
| 8,022,937 B2 | 9/2011 | Palay et al. |
| 8,059,103 B2 | 11/2011 | Geaghan |
| 8,063,322 B2 | 11/2011 | Katsurahira |
| 8,072,431 B2 | 12/2011 | Nishi et al. |
| 8,089,008 B2 | 1/2012 | Katsurahira |
| 8,089,475 B2 | 1/2012 | Ito |
| 8,094,140 B2 | 1/2012 | Katsurahira et al. |
| 8,115,738 B2 | 2/2012 | Ito |
| 8,149,220 B2 | 4/2012 | Fukushima et al. |
| 8,154,525 B2 | 4/2012 | Katsurahira |
| 8,183,476 B2 | 5/2012 | Fukushima et al. |
| 8,212,550 B2 | 7/2012 | Katsurahira et al. |
| 8,228,312 B2 | 7/2012 | Matsubara |
| 8,243,033 B2 | 8/2012 | Ely et al. |
| 8,253,702 B2 | 8/2012 | Katsurahira et al. |
| 8,304,671 B2 | 11/2012 | Fukushima et al. |
| 8,368,669 B2 | 2/2013 | Katsurahira |
| 8,373,683 B2 | 2/2013 | Katsurahira et al. |
| 8,390,272 B2 | 3/2013 | Yokota et al. |
| 8,493,367 B2 | 7/2013 | Yeh et al. |
| 8,525,816 B2 | 9/2013 | Fukushima et al. |
| 8,531,419 B2 | 9/2013 | Katsuhito et al. |
| 8,536,471 B2 | 9/2013 | Stern et al. |

(56) References Cited

U.S. PATENT DOCUMENTS

| | | | |
|---|---|---|---|
| 8,564,564 B2 | 10/2013 | Chang et al. | |
| 8,587,565 B2 | 11/2013 | Fukushima et al. | |
| 8,665,211 B2 | 3/2014 | Kitahara et al. | |
| 8,766,954 B2 | 7/2014 | Vuppu et al. | |
| 8,780,056 B2 | 7/2014 | Yamamoto et al. | |
| 8,963,889 B2 | 2/2015 | Oda et al. | |
| 8,982,044 B2 | 3/2015 | Katsurahira | |
| 9,001,084 B2 | 4/2015 | Yamamoto | |
| 9,019,245 B2 | 4/2015 | Miller et al. | |
| 9,110,542 B2 | 8/2015 | Yokota et al. | |
| 9,158,393 B2 | 10/2015 | Vlasov | |
| 9,176,630 B2 | 11/2015 | Westhues et al. | |
| 9,182,856 B2 | 11/2015 | Logan et al. | |
| 9,218,070 B2 | 12/2015 | Oda et al. | |
| 9,262,025 B2 | 2/2016 | Yu et al. | |
| 9,389,708 B2 | 7/2016 | Hinson | |
| 9,417,738 B2 | 8/2016 | Hargreaves et al. | |
| 9,459,726 B2 | 10/2016 | Katsurahira | |
| 9,632,597 B2 | 4/2017 | Sundara-Rajan et al. | |
| 9,658,720 B2 | 5/2017 | Kremin et al. | |
| 9,746,981 B2 | 8/2017 | Zachut et al. | |
| 9,851,816 B2 | 12/2017 | Chang et al. | |
| 9,874,966 B2 | 1/2018 | Ribeiro | |
| 9,933,867 B2 | 4/2018 | Hargreaves | |
| 10,055,036 B2 | 8/2018 | Koike et al. | |
| 10,061,407 B2 | 8/2018 | Hara et al. | |
| 10,095,329 B1* | 10/2018 | Laslo | H03F 3/217 |
| 10,168,801 B2* | 1/2019 | Osada | G06F 3/0445 |
| 10,198,093 B2 | 2/2019 | Hara et al. | |
| 10,209,829 B2 | 2/2019 | Hara | |
| 10,222,880 B2 | 3/2019 | Hara et al. | |
| 10,289,221 B2* | 5/2019 | Kagami | G06F 3/0446 |
| 10,303,271 B2 | 5/2019 | Chang | |
| 10,401,985 B2 | 9/2019 | Hara et al. | |
| 10,452,168 B2* | 10/2019 | Oda | G06F 3/041 |
| 10,509,491 B2* | 12/2019 | Yamamoto | G06F 3/0416 |
| 10,514,785 B1 | 12/2019 | Hara et al. | |
| 10,627,927 B2* | 4/2020 | Yamamoto | G06F 3/03545 |
| 10,877,580 B2 | 12/2020 | Hara et al. | |
| 11,132,074 B2 | 9/2021 | Hara et al. | |
| 11,216,087 B2* | 1/2022 | Katsurahira | G06F 3/0442 |
| 2001/0001430 A1 | 5/2001 | Ely et al. | |
| 2001/0006369 A1 | 7/2001 | Ely | |
| 2001/0006383 A1 | 7/2001 | Fleck et al. | |
| 2002/0025062 A1 | 2/2002 | Black | |
| 2002/0040817 A1 | 4/2002 | LeKuch et al. | |
| 2002/0070927 A1 | 6/2002 | Fujitsuka et al. | |
| 2002/0176577 A1 | 11/2002 | Xu | |
| 2003/0047360 A1 | 3/2003 | Katsurahira | |
| 2003/0055655 A1 | 3/2003 | Suominen | |
| 2003/0062889 A1 | 4/2003 | Ely et al. | |
| 2003/0122795 A1 | 7/2003 | Fujitsuka et al. | |
| 2003/0142073 A1 | 7/2003 | Fukushima et al. | |
| 2003/0217871 A1 | 11/2003 | Chao et al. | |
| 2004/0039545 A1 | 2/2004 | Katsurahira | |
| 2004/0169594 A1 | 9/2004 | Ely et al. | |
| 2004/0174343 A1 | 9/2004 | Chao et al. | |
| 2004/0233178 A1 | 11/2004 | Silk et al. | |
| 2004/0246230 A1 | 12/2004 | Oda et al. | |
| 2005/0043918 A1 | 2/2005 | Katsurahira | |
| 2005/0102620 A1 | 5/2005 | Seto et al. | |
| 2005/0104865 A1 | 5/2005 | Oda et al. | |
| 2005/0116940 A1 | 6/2005 | Dawson | |
| 2005/0127893 A1 | 6/2005 | Matsubara | |
| 2005/0128191 A1 | 6/2005 | Katsurahira et al. | |
| 2005/0156915 A1 | 7/2005 | Fisher | |
| 2005/0162398 A1 | 7/2005 | Eliasson et al. | |
| 2005/0166076 A1 | 7/2005 | Truong | |
| 2005/0169504 A1 | 8/2005 | Black | |
| 2005/0171714 A1 | 8/2005 | Ely et al. | |
| 2005/0174259 A1 | 8/2005 | Ely | |
| 2005/0180618 A1 | 8/2005 | Black | |
| 2005/0200636 A1 | 9/2005 | Silverbrook et al. | |
| 2005/0237312 A1 | 10/2005 | Lapstun et al. | |
| 2005/0280638 A1 | 12/2005 | Oda | |
| 2006/0087422 A1 | 4/2006 | Oda | |
| 2006/0158440 A1 | 7/2006 | Ashenbrenner | |
| 2006/0197755 A1 | 9/2006 | Bawany | |
| 2006/0215886 A1 | 9/2006 | Black | |
| 2006/0250380 A1 | 11/2006 | Oliver | |
| 2006/0267580 A1 | 11/2006 | Fukushima et al. | |
| 2006/0267961 A1 | 11/2006 | Onoda | |
| 2007/0085836 A1 | 4/2007 | Ely | |
| 2007/0109281 A1 | 5/2007 | Simmons et al. | |
| 2007/0146351 A1 | 6/2007 | Katsurahira et al. | |
| 2007/0177533 A1 | 8/2007 | Palay et al. | |
| 2007/0195069 A1 | 8/2007 | Kable et al. | |
| 2007/0227785 A1 | 10/2007 | Katsurahira | |
| 2007/0285389 A1 | 12/2007 | Ito | |
| 2008/0042985 A1 | 2/2008 | Katsuhito et al. | |
| 2008/0055279 A1* | 3/2008 | Osada | G06F 3/03545 345/179 |
| 2008/0150914 A1 | 6/2008 | Yamamoto | |
| 2008/0164077 A1 | 7/2008 | Yamamoto | |
| 2008/0180411 A1 | 7/2008 | Solomon et al. | |
| 2008/0181143 A1 | 7/2008 | Palay et al. | |
| 2008/0225011 A1 | 9/2008 | Ito | |
| 2008/0238885 A1 | 10/2008 | Zachut et al. | |
| 2008/0257613 A1 | 10/2008 | Katsurahira | |
| 2009/0000831 A1 | 1/2009 | Miller et al. | |
| 2009/0065268 A1 | 3/2009 | Katsurahira | |
| 2009/0065269 A1 | 3/2009 | Katsurahira | |
| 2009/0079671 A1 | 3/2009 | Nishi et al. | |
| 2009/0084614 A1 | 4/2009 | Fukushima et al. | |
| 2009/0127003 A1 | 5/2009 | Geaghan | |
| 2009/0139780 A1 | 6/2009 | Katsurahira et al. | |
| 2009/0160790 A1 | 6/2009 | Fukushima et al. | |
| 2009/0166100 A1 | 7/2009 | Matsubara | |
| 2009/0184940 A1 | 7/2009 | Silk et al. | |
| 2010/0051356 A1 | 3/2010 | Stern et al. | |
| 2010/0110029 A1 | 5/2010 | Yamamoto et al. | |
| 2010/0117994 A1 | 5/2010 | Fukushima et al. | |
| 2010/0207607 A1 | 8/2010 | Katsurahira et al. | |
| 2010/0295826 A1 | 11/2010 | Yeh et al. | |
| 2010/0315384 A1 | 12/2010 | Hargreaves et al. | |
| 2010/0321288 A1 | 12/2010 | Katsurahira et al. | |
| 2011/0068776 A1 | 3/2011 | Yokota et al. | |
| 2011/0069022 A1 | 3/2011 | Yokota et al. | |
| 2011/0090146 A1 | 4/2011 | Katsurahira | |
| 2011/0155479 A1 | 6/2011 | Oda et al. | |
| 2011/0192658 A1 | 8/2011 | Fukushima et al. | |
| 2011/0193776 A1 | 8/2011 | Oda et al. | |
| 2011/0193811 A1 | 8/2011 | Katsuhito et al. | |
| 2011/0234485 A1 | 9/2011 | Kitahara et al. | |
| 2011/0254807 A1 | 10/2011 | Perski et al. | |
| 2012/0007831 A1 | 1/2012 | Chang et al. | |
| 2012/0050207 A1 | 3/2012 | Westhues et al. | |
| 2012/0105361 A1 | 5/2012 | Kremin et al. | |
| 2012/0105362 A1 | 5/2012 | Kremin et al. | |
| 2012/0127132 A1 | 5/2012 | Katsurahira et al. | |
| 2012/0154340 A1 | 6/2012 | Vuppu et al. | |
| 2013/0106794 A1 | 5/2013 | Logan et al. | |
| 2014/0078101 A1 | 3/2014 | Katsurahira | |
| 2014/0176495 A1 | 6/2014 | Vlasov | |
| 2015/0070293 A1 | 3/2015 | Yu et al. | |
| 2015/0145799 A1 | 5/2015 | Katsurahira | |
| 2015/0153845 A1 | 6/2015 | Chang et al. | |
| 2015/0242003 A1 | 8/2015 | Chang | |
| 2015/0324018 A1 | 11/2015 | Hinson | |
| 2015/0363012 A1 | 12/2015 | Sundara-Rajan et al. | |
| 2016/0320895 A1 | 11/2016 | Ribeiro | |
| 2016/0320918 A1 | 11/2016 | Hara | |
| 2017/0108984 A1 | 4/2017 | Takaya et al. | |
| 2017/0192533 A1 | 7/2017 | Hargreaves | |
| 2017/0192549 A1 | 7/2017 | Katayama et al. | |
| 2017/0220138 A1* | 8/2017 | Kagami | G06F 3/0441 |
| 2017/0228049 A1* | 8/2017 | Yamamoto | G06F 3/03545 |
| 2017/0285772 A1* | 10/2017 | Yamamoto | G06F 3/03545 |
| 2018/0024654 A1 | 1/2018 | Koike et al. | |
| 2018/0046272 A1 | 2/2018 | Hara et al. | |
| 2018/0052532 A9* | 2/2018 | Kagami | G06F 3/0442 |
| 2018/0113523 A1 | 4/2018 | Hara et al. | |
| 2018/0120962 A1 | 5/2018 | Hara et al. | |
| 2018/0157341 A1* | 6/2018 | Oda | G06F 3/0446 |

(56) References Cited

U.S. PATENT DOCUMENTS

| | | | |
|---|---|---|---|
| 2018/0232070 A1* | 8/2018 | Katsurahira | G06F 3/0442 |
| 2018/0284909 A1* | 10/2018 | Laslo | H03F 3/245 |
| 2018/0329528 A1 | 11/2018 | Hara et al. | |
| 2018/0356908 A1 | 12/2018 | Koike et al. | |
| 2019/0384423 A1 | 12/2019 | Hara et al. | |
| 2020/0125186 A1 | 4/2020 | Hara et al. | |
| 2021/0117014 A1 | 4/2021 | Hara et al. | |
| 2022/0011882 A1 | 1/2022 | Hara et al. | |
| 2025/0013324 A1* | 1/2025 | Hara | G06F 3/0383 |

FOREIGN PATENT DOCUMENTS

| | | |
|---|---|---|
| JP | 2011138180 A | 7/2011 |
| JP | 2014035631 A | 2/2014 |
| JP | 2014063249 A | 4/2014 |
| JP | 5801020 B1 | 10/2015 |
| WO | WO 2015111159 A1 | 7/2015 |

OTHER PUBLICATIONS

Office Action, dated Jan. 14, 2020, for Japanese Application No. 2017-098610. (6 pages) (with English translation).
Office Action, dated Jun. 30, 2020, for Chinese Application No. 201680027928.6. (9 pages).

* cited by examiner

ACTIVE STYLUS

TECHNICAL FIELD

The present invention relates to an active stylus and, in particular, to an active stylus that supports a plurality of detection methods.

BACKGROUND ART

An active capacitive position detection system is known, which uses electrodes provided in a touch panel to detect a finger to additionally detect the presence and position of a stylus. A stylus used for this type of position detection system is called an "active stylus" and is configured such that a signal can be sent therefrom, via capacitive coupling with the electrodes, to a sensor controller provided in a position detection device. The sensor controller detects the presence and position of the stylus by detecting this signal.

As an example of such an active stylus, Patent Document 1 discloses a stylus configured to send to the sensor controller both a position signal used to derive coordinate data and a data signal representing information such as pen pressure value and unique stylus identifier (ID).

Patent Document 2 discloses another example of an active stylus. The stylus according to this example sends pen pressure detection results in a digital form. Also, in Patent Document 2, a position detection device includes a display device and a transparent sensor. The position detection device detects not only a position pointed to by a stylus and a pen pressure but also a position touched by a finger.

Numerous electronic apparatuses have come along that include a stylus configured to send signals using capacitive coupling. A plurality of signal transmission methods not compatible with each other have come into use as position detection systems included in these electronic apparatuses. Specifically, there exists a mixture of a method that uses a signal obtained by modulating a pulse train signal (including a pulse signal and a rectangular wave signal) as a signal sent by the stylus (hereinafter referred to as a "first method") and a method that uses a signal obtained by modulating a sine wave signal (hereinafter referred to as a "second method") as a signal sent by the stylus.

Patent Document 3 discloses an example of a position detection system that conforms to the first method. The stylus according to this example includes a pen pressure detector and a signal transmission section. The pen pressure detector optically detects a pen pressure. As illustrated in FIG. 10 of Patent Document 3, signals sent by the signal transmission section include a position signal pulse 910 used by the position detection device to detect a stylus position and a pressure signal pulse 950 indicating a pen pressure level detected by the pen pressure detector. The position signal pulse 910 is sent intermittently, and the pressure signal pulse 950 is sent in-between transmissions of the position signal pulses 910 only during detection of a pen pressure (when not in a hovering state). The position signal pulse 910 includes an alternating current (AC) pulse at a given frequency (specifically, 28.125 Hz), and the pressure signal pulse 950 includes a frequency-modulated pulse signal.

Patent Document 4 also discloses an example of a position detection system that conforms to the first method. The stylus according to this example includes a TX drive circuit 680 as illustrated in FIG. 9 of Patent Document 4, and the stylus is configured to send a TX signal 677, which is a pulse train signal similar to a TX signal 632 used during finger detection. The TX signal 677 is detected by a controller via capacitive coupling between the stylus and the sensor.

It should be noted that Patent Document 4 also discloses an arrangement for boosting during transmission of a signal by the stylus (paragraph 0084). According to this, a booster 870 is provided in the stylus to permit amplification of a TX signal 835 by a chip drive circuit 890 that is responsible for sending the TX signal 835.

In contrast, the position detection systems disclosed in Patent Documents 1 and 2 conform to the second method. A stylus according to the second method is configured to modulate a sine wave signal, rather than a pulse train signal such as a signal used during finger detection (signal sent from the sensor controller to the transmitting electrode inside the sensor), in accordance with the pen pressure level and so on, and send the modulated signal. Specifically, for example, the stylus according to the second method is configured to modulate a carrier signal at several hundred to several MHz by amplitude shift keying (ASK) or on-off-keying (OOK) and send the modulated signal. In order to extract the signal at the above frequency, the sensor controller receives the signal via a band-pass filter and recovers the pen pressure value.

PRIOR ART DOCUMENT

Patent Documents

Patent Document 1: PCT Patent Publication No. WO2015/111159
Patent Document 2: Japanese Patent Laid-Open No. 2014-63249
Patent Document 3: U.S. Pat. No. 8,536,471
Patent Document 4: U.S. Patent Application Publication No. 2012-0105362

SUMMARY OF INVENTION

Technical Problem

A position detection device that supports only the second method is unable to receive transmission signals from a stylus that supports only the first method, and a position detection device that supports only the first method is unable to receive transmission signals from a stylus that supports only the second method. As a result, for example, when a user attempts to alternately use position detection devices side by side, one supporting only the first method and another supporting only the second method, each time the user switches from one position detection device to the other, the user must switch the styluses, resulting in inconvenience.

A possible solution to this would be to configure the stylus to send a transmission signal generated by the first method (e.g., signal obtained by modulating a pulse train signal) and a transmission signal generated by the second method (e.g., signal obtained by modulating a sine wave signal) alternately. The method in which the stylus is configured in this manner will be hereinafter referred to as an "alternate transmission method." According to the alternate transmission method, it is possible for both the position detection device supporting only the first method and the position detection device supporting only the second method to receive transmission signals of the stylus, eliminating the need to switch the styluses each time the position detection device is switched. However, it is normally unlikely that both of the position detection devices are used at once. In this method, therefore, one of the signals is always sent uselessly. This is not preferred from the viewpoint of reducing the power consumption of the stylus.

According to one aspect of the invention, even when position detection devices are used side by side alternately, one supporting only the first method and another supporting only the second method, an active stylus would lower power consumption than the alternate transmission method and would eliminate the need to switch styluses each time the position detection device is switched from one to the other.

Technical Solution

An active stylus is provided, which sends information in association with a change in an electric field to a sensor controller via capacitive coupling with a sensor. The active stylus includes a core body, an electrode, a pen pressure detector, a power supply, and a signal processing section. The core body forms a pen tip. The electrode is provided near the core body. The pen pressure detector detects a pen pressure level proportional to a pen pressure applied to the core body. The signal processing section operates in one of first and second modes based on power supplied from the power supply. During operation in the first mode, the signal processing section, while supplying a first transmission signal, obtained by modulating a pulse train signal with the pen pressure level, to the electrode, determines whether or not it is necessary to switch to the second mode. During operation in the second mode, the signal processing section, while supplying a second transmission signal, obtained by modulating a sine wave signal with the pen pressure level, to the electrode, the signal processing section determines whether or not it is necessary to switch to the first mode. When determining that it is necessary to switch to the second mode, the signal processing section switches to operation in the second mode, and when determining that it is necessary to switch to the first mode, the signal processing section switches to operation in the first mode.

An active stylus according to another aspect of the present invention includes a core body, an electrode, a pen pressure detector, a power supply, and a signal processing section. The core body forms a pen tip. The electrode is provided near the core body. The pen pressure detector detects a pen pressure level proportional to a pen pressure applied to the core body. The signal processing section operates in one of first and second modes based on power supplied from the power supply. During operation in the first mode, the signal processing section, while supplying a first transmission signal, obtained by modulating a pulse train with the pen pressure level, to the electrode, determines whether or not it is necessary to switch to the second mode based on a signal received during a time period in which the first transmission signal is not sent. During operation in the second mode, the signal processing section, while supplying a second transmission signal, generated by a modulation method different from the modulation method in which the pulse train is modulated with the pen pressure level, to the electrode, determines whether or not it is necessary to switch to the first mode. When determining that it is necessary to switch to the second mode, the signal processing section switches to operation in the second mode, and when determining that it is necessary to switch to the first mode, the signal processing section switches to operation in the first mode.

Advantageous Effect

According to the present invention, the stylus determines whether or not it is necessary to switch between modes, and the operation mode of the stylus is switched in accordance with the determination result. As a result, the first mode can be used as the operation mode of the stylus when the stylus is used together with a position detection device that supports only the first method, and the second mode can be used as the operation mode of the stylus when the stylus is used together with a position detection device that supports only the second method. Therefore, the stylus can be configured not to send a second transmission signal when used together with a position detection device that supports only the first method, and not to send a first transmission signal when used together with a position detection device that supports only the second method. As a result, when position detection devices are used side by side, one supporting only the first method and another supporting only the second method, it is possible to ensure lower power consumption than the alternate transmission method described above and eliminate the need to change (switch) styluses each time the position detection device is switched from one to the other.

DETAILED DESCRIPTION

A detailed description will be given below of embodiments of the present invention with reference to accompanying drawings.

Figure 1:
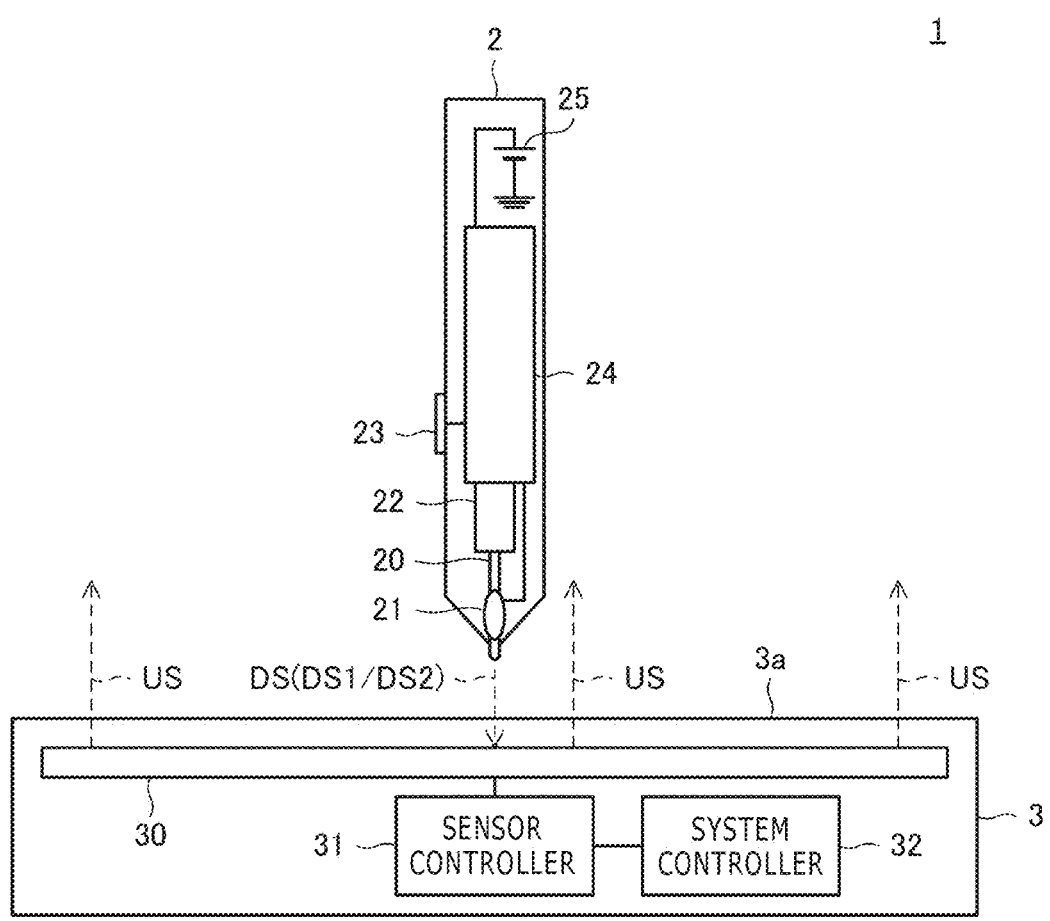
FIG. 1 is a diagram illustrating a configuration of a position detection system 1 according to an embodiment of the present invention.

FIG. 1 is a diagram illustrating a configuration of a position detection system 1 according to an embodiment of the present invention. As illustrated in FIG. 1, the position detection system 1 includes a stylus 2 and a position detection device 3.

Figure 9:
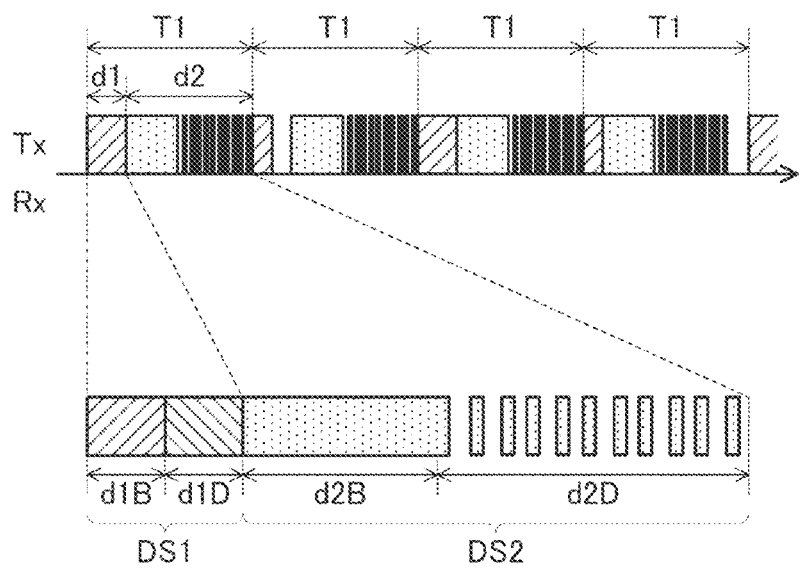
FIG. 9 is a diagram illustrating an example of a signal generated by the control section 90a illustrated in FIG. 4.

The stylus 2 is a position pointer that has a function to send a downlink signal DS to the position detection device 3 and a function to receive an uplink signal US sent by the position detection device 3. The downlink signal DS sent by the stylus 2 includes two kinds of downlink signals DS1 and DS2 (first and second transmission signals) in different formats. As illustrated in FIG. 9 which will be described later, the downlink signal DS1 is a signal that includes a burst signal d1B, a non-modulated pulse train signal, and a data signal d1D obtained by modulating a pulse train signal. Among specific examples of the downlink signal DS1 are a downlink signal based on the modulation method described in Patent Document 3, and a downlink signal comprising a pulse train signal similar to a pulse train signal supplied to a transmitting electrode of a mutually capacitive touch panel or in a correlated manner. On the other hand, the downlink signal DS2 is a signal that includes a burst signal d2B, a non-modulated sine wave signal, and a data signal d2D obtained by modulating a sine wave signal. A specific example of the downlink signal DS2 is a downlink signal used, for example, in the active electrostatic(ES) (trademark) method.

The stylus 2 is configured to include a core body 20, an electrode 21, a pen pressure detector 22, a switch 23, a signal processing section 24, and a power supply 25 as illustrated in FIG. 1.

The core body 20 is a rod-shaped member that is arranged such that its longitudinal direction agrees with the direction of a pen axis of the stylus 2 and makes up a pen tip of the stylus 2. The surface of a front end portion of the core body 20 is coated with a conductive material to form the electrode 21. A rear end portion of the core body 20 is in contact with the pen pressure detector 22. The pen pressure detector 22 detects a pen pressure level (pen pressure level P illustrated in FIG. 4 and so on which will be described later) proportional to the pressure applied to the front end of the core body 20 (pen pressure applied to the core body 20) when the pen tip of the stylus 2 is pressed against a touch surface 3*a* (described later) of the position detection device 3 or the like. In a specific example, the pen pressure detector 22 includes a variable capacitance module whose capacitance changes with pen pressure.

The electrode 21 is a conductor provided near the core body 20 and is electrically connected to the signal processing section 24 by wiring. When the signal processing section 24 supplies the downlink signal DS to the electrode 21, electric charge proportional to the supplied downlink signal DS is induced in the electrode 21. As a result, the capacitance in a sensor 30 which will be described later changes, allowing the position detection device 3 to receive the downlink signal DS by detecting this change. Also, when the uplink signal US sent by the position detection device 3 arrives at the electrode 21, electric charge proportional to the incoming uplink signal US is induced in the electrode 21. The signal processing section 24 receives the uplink signal US by detecting the electric charge induced in the electrode 21.

The switch 23 is, for example, a side switch provided on a lateral side of a housing of the stylus 2 and serves as an input section configured to accept user operation. Specifically, the switch 23 is configured to output switch information SW illustrated in FIG. 4 and so on described later in accordance with a state produced by user operation (pressed state). The switch information SW is information indicating one of two states, such as ON and OFF.

The signal processing section 24 has a function to receive the uplink signal US sent by the position detection device 3 via the electrode 21 and has a function to generate the downlink signal DS (downlink signals DS1 and DS2) and send the signal via the electrode 21 to the position detection device 3. It should be noted that the uplink signal US may include a command as will be described later. In that case, the signal processing section 24 acquires the command by demodulating and decoding the received uplink signal US and generates the downlink signal DS in accordance with the acquired command.

The power supply 25 is used to supply operating power (direct current (DC) power) to the signal processing section 24 and includes, for example, a cylindrical AAAA battery.

The position detection device 3 is configured to include the sensor 30, a sensor controller 31, and a system controller 32 as illustrated in FIG. 1. The sensor 30 forms the touch surface 3*a*. The system controller 32 controls the respective sections of the position detection device 3 including the sensor 30 and the sensor controller 31.

The sensor controller 31 has a function to receive the downlink signal DS sent by the stylus 2 via the sensor 30 and a function to send the uplink signal US via the sensor 30 toward the stylus 2.

Although only one position detection device 3 is illustrated in FIG. 1, the sensor controller 31 can be classified into a type that can receive the downlink signal DS1 but cannot receive the downlink signal DS2 (position detection device 3 supporting only the first method described above) and a type that can receive the downlink signal DS2 but cannot receive the downlink signal DS1 (position detection device 3 supporting only the second method described above). The stylus 2 according to the present embodiment is characterized in that it is configured to offer lower power consumption than the alternate transmission method, which will be described with reference to FIGS. 4 to 9, and eliminate the need to change (switch) the styluses 2 each time the position detection device 3 is switched from one to the other when these two position detection devices 3 are used side by side.

Figure 2:
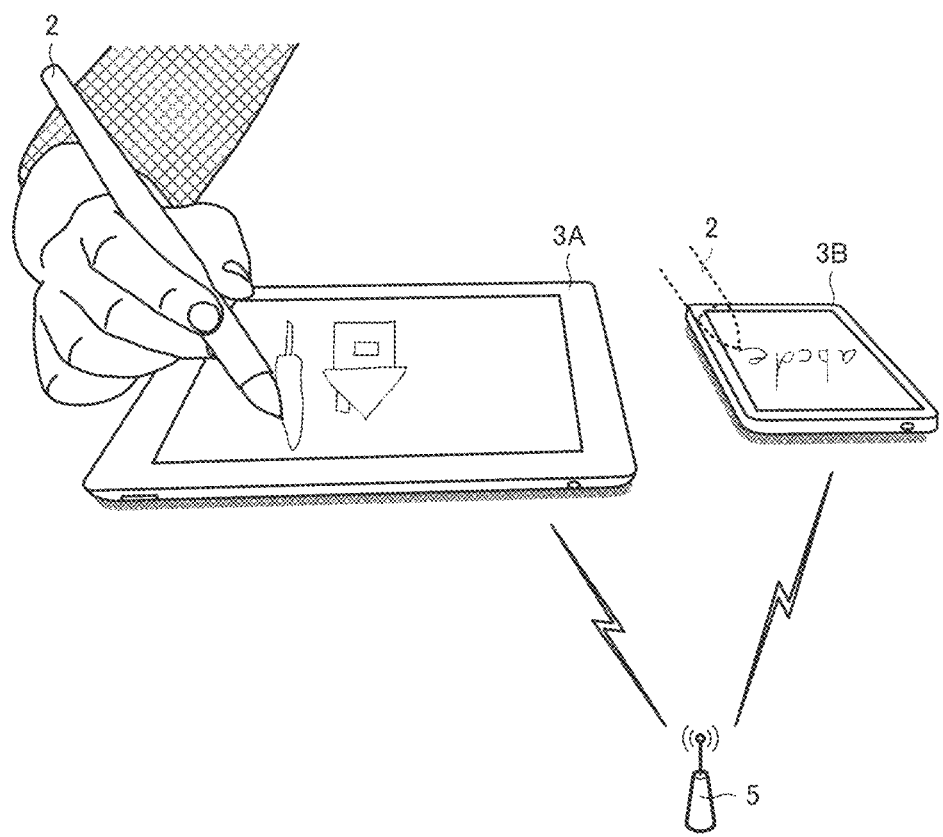
FIG. 2 is a diagram illustrating the manner in which the position detection system 1 according to the embodiment of the present invention is used.

FIG. 2 is a diagram illustrating an example of the manner in which the position detection system 1 is used. FIG. 2 illustrates an example in which position detection devices 3A and 3B, which are two types of the position detection devices 3 each illustrated in FIG. 1, are placed side by side on a desk and a single user inputs a picture into the position detection device 3A and text into the position detection device 3B, respectively, by using a single stylus 2. The present invention is effective in such a case. It should be noted that, in the example illustrated in FIG. 2, each of the position detection devices 3A and 3B is connected to a server not depicted via an access point 5, and that the server combines the picture input into the position detection device 3A and the text input into the position detection device 3B into a single document.

Figure 3:
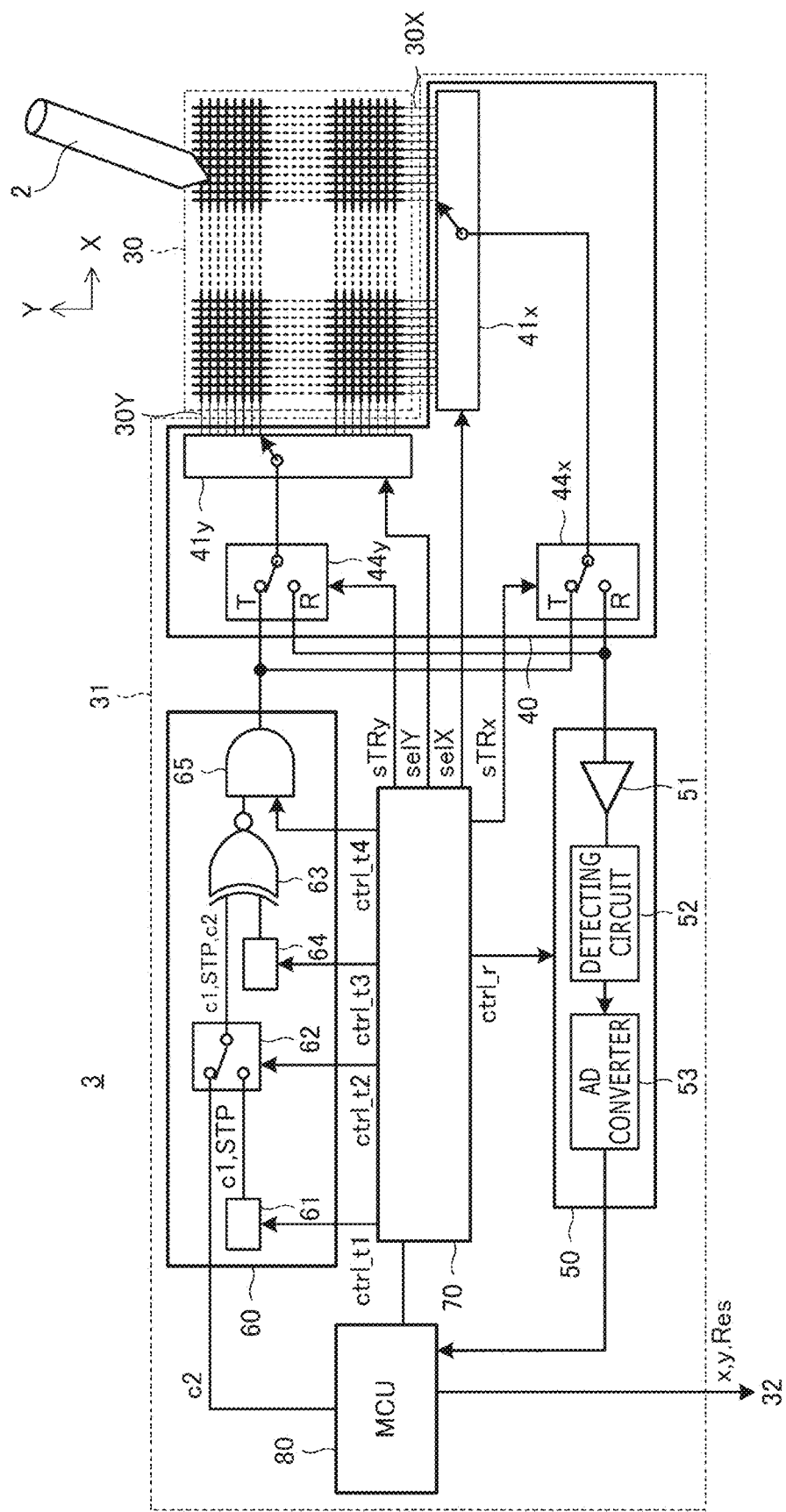
FIG. 3 is a diagram illustrating a configuration of a position detection device 3 according to the embodiment of the present invention.

FIG. 3 is a diagram illustrating a configuration of the position detection device 3. FIG. 3 illustrates the configurations of the above two types of position detection devices 3 as merged together, and the sections involved in sending the uplink signal US is a configuration specific to the type of the position detection device 3 capable of receiving the downlink signal DS2. In other words, the type of the position detection device 3 not capable of receiving the downlink signal DS2 does not have a function to send the uplink signal US.

As illustrated in FIG. 3, the sensor 30 is configured so that a plurality of linear electrodes 30X and a plurality of linear electrodes 30Y are arranged in a matrix fashion, and the sensor 30 is capacitively coupled with the stylus 2 by these linear electrodes 30X and 30Y. The sensor 30 is used not only to detect the stylus 2 but also to detect fingers. Also, the sensor controller 31 is configured to include a transmitting section 60, a selecting section 40, a receiving section 50, a logic section 70, and a memory control unit (MCU) 80.

The transmitting section 60 is a circuit for sending the uplink signal US illustrated in FIG. 1. Specifically, the transmitting section 60 is configured to include a pattern supply section 61, a switch 62, a spreading process section 63, a code sequence holding section 64, and a transmission guard section 65. Although a description will be given assuming that the pattern supply section 61 is included in the transmitting section 60 in the present embodiment, the pattern supply section 61 may be included in the MCU 80.

The pattern supply section 61 retains a detection pattern c1 and has a function to continuously and repeatedly output a signal (or bit string) that matches with the detection pattern c1 during a given continuous transmission period (e.g., 3 milliseconds) in accordance with the instruction of a control signal ctrl_t1 supplied from the logic section 70. The pattern supply section 61 also has a function to output a given delimiting pattern STP at least twice in a row immediately after the end of this continuous transmission period or when the transmission of control information c2 described later begins.

The detection pattern c1 is a symbol value pattern used by the stylus 2 to detect the presence of the sensor controller 31 and is known to the stylus 2 in advance (before the stylus 2 detects the sensor controller 31). A symbol refers to a unit of information used for modulation in a transmission process (unit of information represented by a transmission signal) and to a unit of information obtained by demodulating one symbol, which is a reception signal, in a reception process. A symbol value can include a value converted into a bit string (hereinafter referred to as a "value associated with a bit string") and a value not converted into a bit string by the stylus 2 that has received the symbol (hereinafter referred to as a "value not associated with a bit string"). As illustrated in Table 1 depicted later, a symbol pertaining to the former takes on values whose number is a power of two and can be associated with a bit string such as "0001." The bit length of each symbol denoted by a bit string as described above is determined by the specification of the spreading process section 63. On the other hand, a symbol pertaining to the latter takes on one or more values (e.g., two values) and takes on values that are not associated with bit strings such as "P," "M," and so on, as illustrated in Table 1 below. In the example illustrated in Table 1 below, "P" and "M" are associated with a given spreading code sequence and an inverted code sequence thereof, respectively.

A detection pattern c1 is expressed by a pattern of values not associated with bit strings. Specifically, the detection pattern c1 is made up of a repetition of "P" and "M," such as "PMPMPM . . . "

The delimiting pattern STP is a symbol pattern for notifying the stylus 2 of the end of the continuous transmission period described above and is made up of a symbol pattern that does not appear in the repeated detection pattern c1. For example, if the detection pattern c1 is made up of a repetition of "P" and "M," such as "PMPMPM . . . " as described above, the delimiting pattern STP can be made up of a pattern "PP" which is two consecutive occurrences of "P". The configurations of the delimiting pattern STP and the detection pattern c1 may be reversed so that the delimiting pattern STP is made up of "PM" and the detection pattern c1 is made up of "PP."

The switch 62 has a function to select one of the pattern supply section 61 and the MCU 80 based on a control signal ctrl_t2 supplied from the logic section 70 and supply the selected one of the outputs to the spreading process section 63. When the switch 62 selects the pattern supply section 61, the spreading process section 63 is supplied with the detection pattern c1 or the delimiting pattern STP. On the other hand, when the switch 62 selects the MCU 80, the spreading process section 63 is supplied with the control information c2 from the MCU 80.

The control information c2 includes a command indicating details of an instruction issued to the stylus 2 and is generated by the MCU 80. The control information c2 differs from the detection pattern c1 in that the control information c2 includes a symbol value (e.g., 0 to 15) associated with a bit string having an arbitrary length (e.g., 4 bit length) and in that the value is not shared with the stylus 2 in advance. Also, the control information c2 differs from the detection pattern c1 that includes the values "P" and "M" in that the control information c2 is represented by "D," which is a value represented by a bit string having an arbitrary length (e.g., 4 bit length), i.e., one of a power-of-two (e.g., 16) number of values that can be represented by a bit string having the arbitrary length.

The code sequence holding section 64 has a function to generate and retain an 11-chip-long spreading code PN having an autocorrelation characteristic based on a control signal ctrl_t3 supplied from the logic section 70. The spreading code PN retained by the code sequence holding section 64 is supplied to the spreading process section 63.

The spreading process section 63 has a function to obtain a 12-chip-long transmission chip sequence by modulating the spreading code PN retained by the code sequence holding section 64 based on the symbol value (information represented by the transmission signal as a result of the process performed by the spreading process section 63) supplied via the switch 62. A description will be given below of this function by citing a specific example.

In the example described below, we assume that the detection pattern c1, the delimiting pattern STP, and the control information c2 are made up of combinations of 0 to 15, which are values associated with bit strings (associated bit strings "0000" to "1111"), and "P" and "M," which are values not associated with bit strings, respectively. We also assume that the spreading code PN retained by the code sequence holding section 64 is "00010010111." In this case, the spreading process section 63 converts each of the symbol values (0 to 15 and P and M) into a transmission chip sequence in accordance with Table 1 depicted below.

TABLE 1

| Symbol Value | Associated Bit String | Polarity | Shift Amount | Transmission Chip Sequence |
|---|---|---|---|---|
| P | Non-associated | Noninverted | 0 (reference) | 100010010111 |
| 0 | 0000 | Noninverted | +2 | 111000100101 |
| 1 | 0001 | Noninverted | +3 | 111100010010 |
| 3 | 0011 | Noninverted | +4 | 101110001001 |
| 2 | 0010 | Noninverted | +5 | 110111000100 |
| 6 | 0110 | Noninverted | +6 | 101011100010 |
| 7 | 0111 | Noninverted | +7 | 100101110001 |
| 5 | 0101 | Noninverted | +8 | 110010111000 |
| 4 | 0100 | Noninverted | +9(−2) | 101001011100 |
| M | Non-associated | Inverted | 0 (reference) | 011101101000 |
| 8 | 1000 | Inverted | +2 | 000111011010 |
| 9 | 1001 | Inverted | +3 | 000011101101 |
| 11 | 1011 | Inverted | +4 | 010001110110 |
| 10 | 1010 | Inverted | +5 | 001000111011 |
| 14 | 1110 | Inverted | +6 | 010100011101 |
| 15 | 1111 | Inverted | +7 | 011010001110 |
| 13 | 1101 | Inverted | +8 | 001101000111 |
| 12 | 1100 | Inverted | +9(−2) | 010110100011 |

As illustrated in Table 1, the symbol value "P" is converted into a transmission chip sequence made up of "1" followed by the spreading code PN of "00010010111" in this example. Also, each of the symbol values "0" to "7" is converted into a transmission chip sequence made up of "1" followed by a code sequence obtained by cyclically shifting the spreading code PN of "00010010111" by the shift amount illustrated in Table 1. Other symbol values "M" and "8" to "15" are converted into transmission chip sequences obtained by inverting the transmission chip sequences associated, respectively, with the symbol values "P" and "0" to "7."

The spreading process section 63 is configured to obtain the transmission chip sequences by the conversion process described above and supply the sequences to the transmission guard section 65.

The transmission guard section 65 has a function to insert a guard period, which is a period during which neither transmission nor reception is conducted to facilitate switching between transmission and reception operations, between a transmission period of the uplink signal US and a reception period for receiving a signal from the stylus 2 based on a control signal ctrl_t4 supplied from the logic section 70.

The selecting section 40 is a switch that switches between the transmission period, during which signals are sent from the sensor 30, and the reception period, during which signals are received by the sensor 30, based on control performed by the logic section 70. Describing specifically, the selecting section 40 is configured to include a switch 44x, a switch 44y, a conductor selection circuit 41x, and a conductor selection circuit 41y. The switch 44x operates, based on a control signal sTRx supplied from the logic section 70, in such a manner as to connect the output end of the transmitting section 60 to the input end of the conductor selection circuit 41x during the transmission period and connect the output end of the conductor selection circuit 41x to the input end of the receiving section 50 during the reception period. The switch 44y operates, based on a control signal sTRy supplied from the logic section 70, in such a manner as to connect the output end of the transmitting section 60 to the input end of the conductor selection circuit 41y during the transmission period and connect the output end of the conductor selection circuit 41y to the input end of the receiving section 50 during the reception period. The conductor selection circuit 41x operates, based on a control signal selX supplied from the logic section 70, in such a manner as to select one or a plurality of the plurality of linear electrodes 30X and connect the selected one or ones to the switch 44x. The conductor selection circuit 41y operates, based on a control signal selY supplied from the logic section 70, in such a manner as to select one or a plurality of the plurality of linear electrodes 30Y and connect the selected one or ones to the switch 44y. The plurality of linear electrodes 30X or the plurality of linear electrodes 30Y are selected by the conductor selection circuit 41x or 41y, for example, when the uplink signal US is sent from the entire touch surface 3a.

The receiving section 50 is a circuit for receiving the downlink signal DS (downlink signal DS1 or downlink signal DS2) sent by the stylus 2 based on a control signal ctrl_r of the logic section 70. Specifically, the receiving section 50 is configured to include an amplifying circuit 51, a detecting circuit 52, and an analog-digital (AD) converter 53.

The amplifying circuit 51 amplifies the downlink signal DS supplied from the selecting section 40 and outputs the amplified signal. The detecting circuit 52 is a circuit that generates a voltage proportional to the level of the output signal of the amplifying circuit 51. The AD converter 53 is a circuit that generates a digital signal by sampling the voltage output from the detecting circuit 52 at a given time interval. The digital signal output by the AD converter 53 is supplied to the MCU 80.

The receiving section 50 included in the type of the position detection device 3 that can receive the downlink signal DS1 but cannot receive the downlink signal DS2 is configured to receive a non-modulated pulse train signal or a signal obtained by modulating a pulse train signal but is configured not to (configured to be unable to) receive a non-modulated sine wave signal or a signal obtained by modulating a sine wave signal. In this case, therefore, a digital signal is supplied to the MCU 80 from the receiving section 50 only when the downlink signal DS1 arrives at the sensor 30. On the other hand, the receiving section 50 included in the type of the position detection device 3 that can receive the downlink signal DS2 but cannot receive the downlink signal DS1 is configured to receive a non-modulated sine wave signal or a signal obtained by modulating a sine wave signal but is configured not to (configured to be unable to) receive a non-modulated pulse train signal or a signal obtained by modulating a pulse train signal. In this case, therefore, a digital signal is supplied to the MCU 80 from the receiving section 50 only when the downlink signal DS2 arrives at the sensor 30.

The logic section 70 and the MCU 80 are control sections that control transmission and reception operations of the transmitting section 60 and the receiving section 50. Describing specifically, the MCU 80 is a microprocessor that includes a read only memory (ROM) and a random access memory (RAM) therein and operates based on a given program. On the other hand, the logic section 70 is configured to output the respective control signals described above based on control performed by the MCU 80. Also, the MCU 80 is configured to perform a process of deriving coordinate data x and y and so on indicating the position of the stylus 2 based on the digital signal supplied from the AD converter 53, and outputting the coordinate data to the system controller 32. The MCU 80 further performs a process of obtaining data Res represented by the digital signal supplied from the AD converter 53 and outputting the data Res to the system controller 32 when the digital signal indicates the data signal d1D or the data signal d2D.

A detailed description will be given below of a configuration of the stylus 2 and processes performed by the stylus 2. First, the stylus 2 that employs the alternate transmission method described above will be described, and then the stylus 2 in first to fifth embodiments of the present invention will be described.

Figure 4:
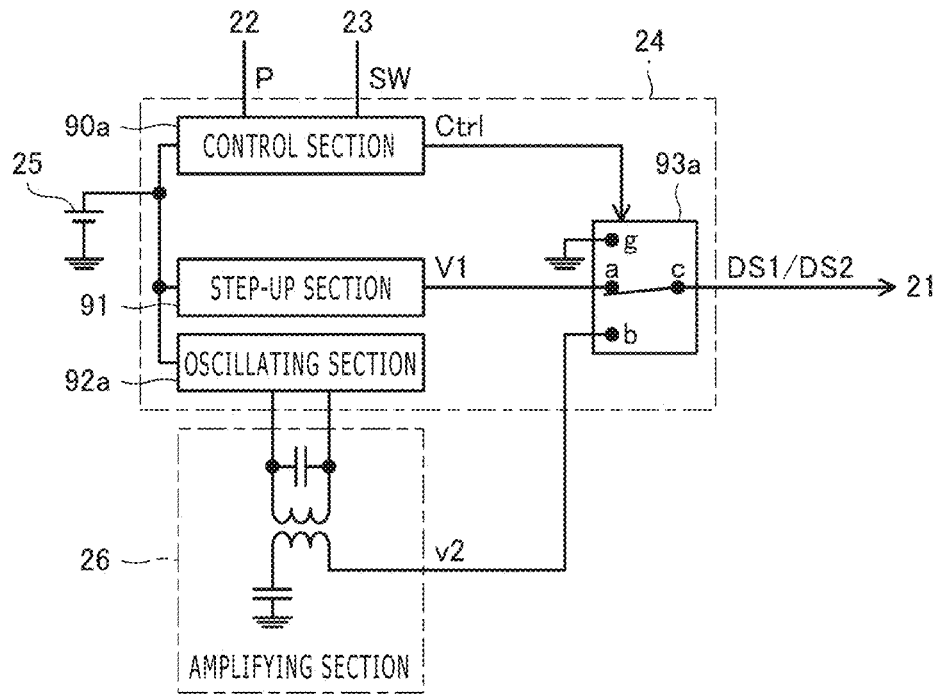
FIG. 4 is a diagram illustrating a configuration of a stylus 2 according to a comparative art of the present invention.

FIG. 4 is a diagram illustrating a configuration of the stylus 2 according to a comparative art of the present invention. The stylus 2 illustrated in FIG. 4 employs the alternate transmission method described above and corresponds to the comparative art of the present invention. The stylus 2 was invented by the inventor of the present invention similar to the stylus 2 in the first to fifth embodiments described later and was not known to the public as of the priority date of the present application.

As illustrated in FIG. 4, the stylus 2 employing the alternate transmission method is configured to include an amplifying section 26 as well as the signal processing section 24 and the power supply 25 illustrated also in FIG. 1. The signal processing section 24 is configured to include a control section 90a, a step-up section 91, an oscillating section 92a, and a switch section 93a. It should be noted that although FIG. 4 does not illustrate a function relating to the reception of the uplink signal US of the functions of the signal processing section 24, the stylus 2 employing the alternate transmission method may also have a function relating to the reception of the uplink signal US as does the stylus 2 according to each of the embodiments of the present invention which will be described later.

The step-up section 91 has a function to generate a DC voltage V1 by increasing the DC voltage supplied from the power supply 25. In a specific example, the step-up section 91 includes a DC-DC converter or a charge pump circuit.

The oscillating section 92a has a function to generate a non-modulated sine wave signal that oscillates at a given frequency (carrier signal) by performing an oscillating action based on the DC voltage supplied from the power supply 25. The amplifying section 26 has a function to generate a non-modulated sine wave signal v2 by amplifying the sine wave signal generated by the oscillating section 92a with a given amplification factor. It is preferred that the amplifying section 26 should include an amplifying circuit made up of a transformer and a capacitor as illustrated in FIG. 4.

The switch section 93a is a unipolar triple-throw switch element and is configured to include a terminal 'a' connected to the output end of the step-up section 91, a terminal 'b' connected to the output end of the amplifying section 26, a terminal 'g' connected to power wiring to which a ground potential is supplied, and a common terminal 'c' connected to the electrode 21.

The control section 90a is an integrated circuit (IC) that supplies a control signal Ctrl for controlling the switch section 93a and is configured to operate based on power supplied from the power supply 25. In a specific example, the control section 90a may be an application specific integrated circuit (ASIC) or an MCU.

When sending the downlink signal DS1, the control section 90a controls the switch section 93a such that the switch section 93a functions as a first switch section provided between the output end of the step-up section 91 and the electrode 21. That is, the control section 90a performs a process of switching the switch section 93a between a state in which the terminal 'a' is connected to the common terminal 'c' and a state in which the terminal 'g' is connected to the common terminal 'c.' The state in which the terminal 'a' is connected to the common terminal 'c' corresponds to the ON state of the first switch section, and the state in which the terminal 'g' is connected to the common terminal 'c' corresponds to the OFF state of the first switch section.

At a time when the burst signal d1B of the downlink signal DS1 is sent, the control section 90a performs control in such a manner as to switch the switch section 93a periodically at a given interval. When the terminal 'a' is connected to the common terminal 'c,' the DC voltage V1 is the output voltage of the switch section 93a. On the other hand, when the terminal 'g' is connected to the common terminal 'c,' the ground potential is the output voltage of the switch section 93a. Therefore, a non-modulated pulse train signal is output from the switch section 93a, serving as the burst signal d1B.

At a time when the data signal d1D of the downlink signal DS1 is sent, on the other hand, the control section 90a performs control in such a manner as to switch the switch section 93a in accordance with the data Res such as the pen pressure level P and the switch information SW. It should be noted that the data Res may include other information such as identification information of the stylus 2. The control section 90a generates the data signal d1D, a pulse train signal modulated based on the data Res, through this switching control.

Numerous methods are possible as specific methods used by the control section 90a to modulate a pulse train signal. A description will be given below of a case in which on-off modulation is used and a case in which frequency modulation is used by depicting specific examples.

Figure 5:
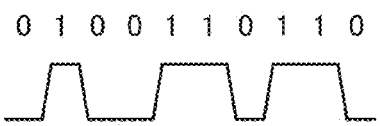
FIG. 5 is a diagram illustrating an example of a data signal d1D generated by a control section 90a illustrated in FIG. 4 (in the case of an on-off-modulated pulse train signal).

FIG. 5 is a diagram illustrating an example of the data signal d1D generated by the control section 90a (in the case of an on-off modulated pulse train signal). In this case, the control section 90a switches the switch section 93a to the terminal 'a' side when the target bit of the data Res to be sent is "1" and switches the switch section 93a to the terminal 'g' side when the target bit of the data Res to be sent is "0." As a result, the data signal d1D becomes a binary signal which assumes a high level (=DC voltage V1) when the target bit to be sent is "1" and assumes a low level (=ground potential) when the target bit to be sent is "0" as illustrated in FIG. 5

Figure 6:
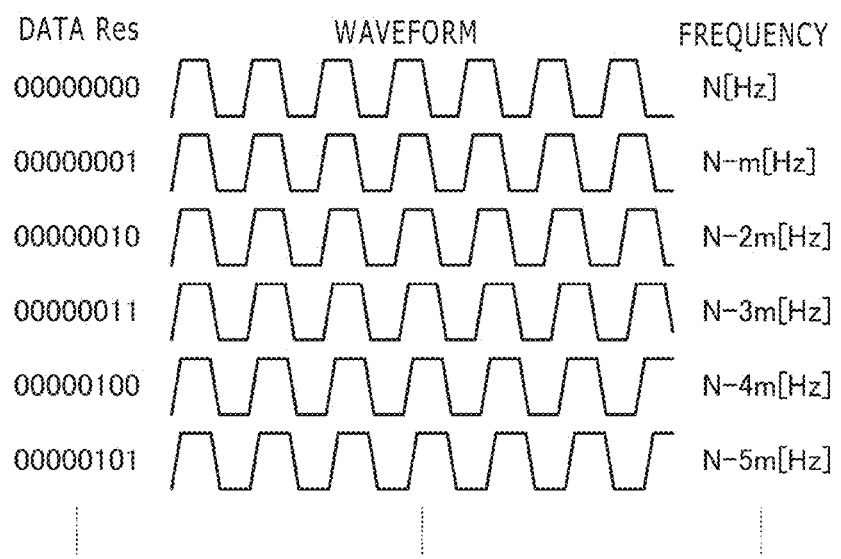
FIG. 6 is a diagram illustrating another example of the data signal d1D generated by the control section 90a illustrated in FIG. 4 (in the case of a frequency-modulated pulse train signal).

FIG. 6 is a diagram illustrating another example of the data signal d1D generated by the control section 90a (in the case of a frequency-modulated pulse train signal). In this case, the control section 90a switches the switch section 93a at a frequency that matches with the value of the data Res. For example, FIG. 6 illustrates an example in which when the data Res is 8-bit data and the value expressed by this 8-bit data is x, the control section 90a performs control in such a manner as to switch the switch section 93a at a frequency N-xxm [Hz]. As illustrated in this example, the data signal d1D in this case is a pulse train signal that oscillates at a frequency that matches with the value of the data Res.

Referring back to FIG. 4, when sending the downlink signal DS2, the control section 90a controls the switch section 93a such that the switch section 93a functions as a second switch section provided between the output end of the amplifying section 26 and the electrode 21. That is, the control section 90a performs a process of switching the switch section 93a between a state in which the terminal 'b' is connected to the common terminal 'c' and a state in which the terminal 'g' is connected to the common terminal 'c.' The state in which the terminal 'b' is connected to the common terminal 'c' corresponds to the ON state of the second switch section, and the state in which the terminal 'g' is connected to the common terminal 'c' corresponds to the OFF state of the second switch section.

At a time when the burst signal d2B of the downlink signal DS2 is sent, the control section 90a keeps the switch section 93a set to the terminal 'b' side. Therefore, the non-modulated sine wave signal v2 is output from the switch section 93a, serving as the burst signal d2B.

At a time when the data signal d2D of the downlink signal DS2 is sent, on the other hand, the control section 90a performs control in such a manner as to switch the switch section 93a in accordance with the data Res such as the pen pressure level P and the switch information SW. It should be noted that, also in this case, the data Res may include other information such as identification information of the stylus 2. The control section 90a generates the data signal d2D, which is a sine wave signal modulated based on the data Res, through this switching control.

On-off modulation is used by the control section 90a as a specific method of modulating a sine wave signal.

Figure 7:
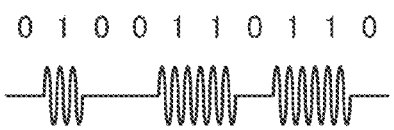
FIG. 7 is a diagram illustrating an example of a data signal d2D generated by the control section 90a illustrated in FIG. 4 (in the case of an on-off modulated sine wave signal).

FIG. 7 is a diagram illustrating an example of the data signal d2D generated by the control section 90a (in the case of an on-off modulated sine wave signal). The control section 90a switches the switch section 93a to the terminal 'b' side when the target bit of the data Res to be sent is "1" and switches the switch section 93a to the terminal 'g' side when the target bit of the data Res to be sent is "0." As a result, the data signal d2D is the sine wave signal v2 when the target bit to be sent is "1" and is a signal kept at ground potential when the target bit to be sent is "0" as illustrated in FIG. 7.

Here, as can be understood from FIG. 7, when the target bit to be sent is "0," the state in which nothing is sent is assumed. In order to prevent continuation of this state in which nothing is sent, the control section 90a may generate the data signal d2D by Manchester-coding the data Res and controlling the switching of the switch section 93a based on the Manchester-coded data Res.

Referring back to FIG. 4, the control section 90a is configured to send the downlink signal DS1 and the downlink signal DS2 alternately. This is designed to ensure that both the position detection device 3 supporting only the downlink signal DS1 and the position detection device 3 supporting only the downlink signal DS2 can receive a transmission signal of the stylus 2. Because the downlink signals DS1 and DS2 are sent alternately, the inventor of the present application calls this method the "alternate transmission method." A detailed description will be given below.

Figure 8:
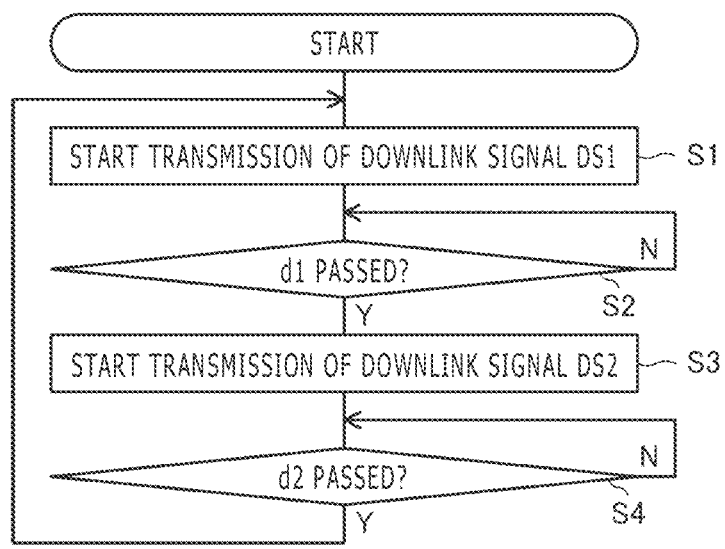
FIG. 8 is a flowchart illustrating processes performed by the control section 90a illustrated in FIG. 4.

FIG. 8 is a flowchart illustrating processes performed by the control section 90a. On the other hand, FIG. 9 is a diagram illustrating an example of a signal generated by the control section 90a. It should be noted that the horizontal axis in FIG. 9 indicates time and that the upper side of the horizontal axis indicates transmission Tx and the lower side thereof indicates reception Rx. The description will be continued below with reference to these figures.

First, as illustrated in FIG. 9, the control section 90a is configured to repeat a process of sending the downlink signals DS1 and DS2 at a regular interval T1. During each interval T1, the control section 90a performs a process of sending the burst signal d1B of the downlink signal DS1, the data signal d1D of the downlink signal DS1, the burst signal d2B of the downlink signal DS2, and the data signal d2D of the downlink signal DS2 in this order. The transmission of the downlink signal DS1 is conducted by using a time d1 (d1<T1) during the interval T1, and the transmission of the downlink signal DS2 is conducted by using a time d2 (d2=T1-d1) during the interval T1. It should be noted that generally d1<d2.

Here, it is preferred that specific values of T1 and d2 should be selected such that the transmission interval of the downlink signal DS2 sent by the control section 90a is equal to the transmission interval of the downlink signal DS2 sent by the stylus that supports only the transmission of the downlink signal DS2 (i.e., stylus that has no function to send the downlink signal DS1). This allows the sensor controller 31 to receive the downlink signal DS2 at the same interval as when the stylus supporting only the transmission of the downlink signal DS2 conducts transmission. It should be noted that, when the stylus of the "alternate transmission method" is used to transmit the downlink signal DS2 having the same data amount as for the stylus supporting only the transmission of the downlink signal DS2, it may encounter shortage of time because of the need to also send the downlink signal DS1. In that case, however, the transmission data amount of one or both the burst signal d2B and the data signal d2D may be reduced. For example, assuming that a stylus supporting only the transmission of the downlink signal DS2 sends N symbols per interval, the control section 90a may send only M (M<N) symbols within one interval of the interval T1.

The section hatched with polka dots in FIG. 9 represents a section in which the sine wave signal v2 is sent. According to this notation, the data signal d2D is a signal that is sent intermittently as illustrated in FIG. 9. This is in line with the fact that the signal processing section 24 does not output the sine wave signal v2 when the target bit to be sent is "0" as described with reference to FIG. 7.

Referring to the flowchart in FIG. 8, upon initiating its process, the control section 90a starts to send the downlink signal DS1 first (step S1). Thereafter, the control section 90a monitors the passage of time while, at the same time, sending the downlink signal DS1 (step S2) and when a given time d1 elapses starts to send the downlink signal DS2 (step S3). Thereafter, the control section 90a monitors the passage of time while, at the same time, sending the downlink signal DS2 (step S4) and when a given time d2 elapses returns to step S1 and starts to send the downlink signal DS1 again. Thus, the control section 90a sends the downlink signals DS1 and DS2 alternately. This makes it possible for the position detection device 3 supporting only the downlink signal DS1 and the position detection device 3 supporting only the downlink signal DS2 to receive a transmission signal of the stylus 2.

According to control performed by the control section 90a, on the other hand, the downlink signals DS1 and DS2 are sent repeatedly at all times. This means that either the downlink signal DS1 or DS2 is sent uselessly at all times, which is not preferred from the viewpoint of reducing the power consumption of the stylus 2 as described earlier. Such a problem can be avoided to lower power consumption while eliminating the need to change styluses each time the position detection device 3 is switched from one to the other.

A detailed description will be given below of the first to fifth embodiments of the present invention one by one.

Figure 10:
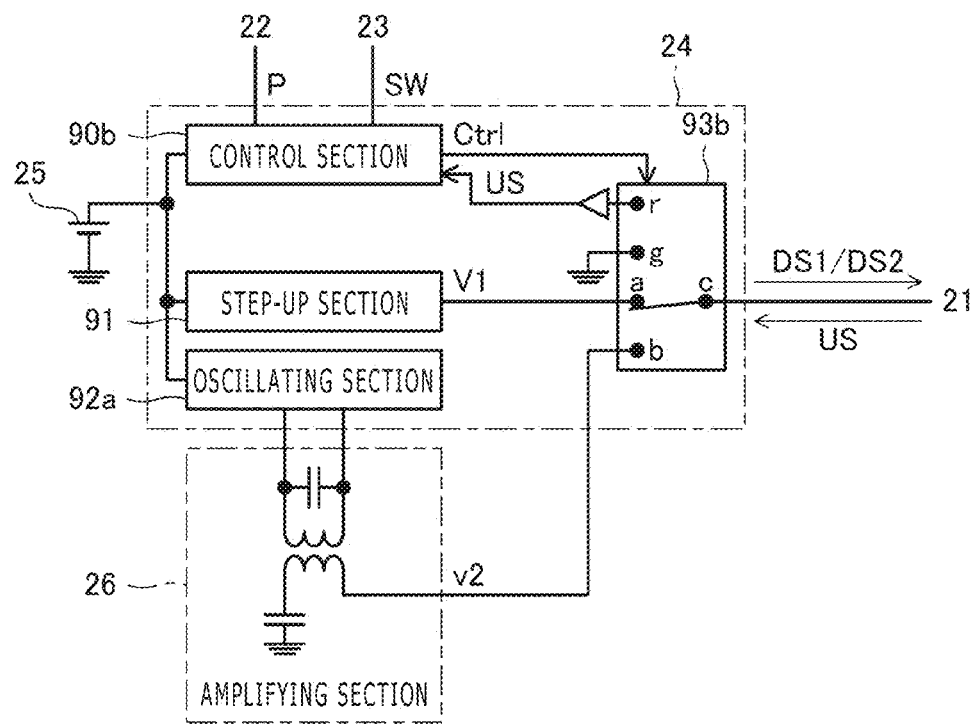
FIG. 10 is a diagram illustrating a configuration of the stylus 2 according to a first embodiment of the present invention.

FIG. 10 is a diagram illustrating a configuration of the stylus 2 according to the first embodiment of the present invention. The stylus 2 illustrated in FIG. 10 differs from the stylus 2 illustrated in FIG. 4 in that it has a control section 90b and a switch section 93b in place of the control section 90a and the switch section 93a. The stylus 2 illustrated in FIG. 10 is the same as the stylus 2 illustrated in FIG. 4 in all other respects, and the same components will be denoted by the same reference symbols, and a description will be given with focus on the differences.

The switch section 93b is a unipolar quadruple-throw type with a terminal 'r' added to the switch section 93a. The terminal 'r' is connected to a receiving terminal of the control section 90b via a buffer. Also, the control section 90b is configured such that the uplink signal US reception function is added to the control section 90a and is configured to operate in either the first or second mode.

As for the uplink signal US reception function, the control section 90b is configured to handle transmission and reception in a time-divided manner. That is, the control section 90b is not configured to be able to handle transmission and reception at the same time. The basic operation of the control section 90b for transmission is as described above about the control section 90a. When handling reception, on the other hand, the control section 90b switches the switch section 93b to the terminal 'r' side using the control signal Ctrl. This allows electric charge that appears on the electrode 21 to be supplied to the receiving terminal of the control section 90b. As a result, the control section 90b receives the uplink signal US sent by the position detection device 3 based on the electric charge supplied as described above.

The first mode is a mode in which the stylus 2 sends the downlink signal DS1. On the other hand, the second mode is a mode in which the stylus 2 sends the downlink signal DS2. During operation in the first mode, while generating the downlink signal DS1 and supplying the signal to the electrode 21 by the above process, the control section 90b performs a process of determining whether or not it is necessary to switch to the second mode. During operation in the second mode, while generating the downlink signal DS2 and supplying the signal to the electrode 21 by the above process, the control section 90b performs a process of determining whether or not it is necessary to switch to the first mode. The control section 90b makes these determinations based on whether the uplink signal US has been received or not received in each mode. Then, when determining, as a determination result, that it is necessary to switch to the second mode, the control section 90b switches its operation to that in the second mode. Also, when determining that it is necessary to switch to the first mode, the control section 90b switches its operation to that in the first mode. A specific description will be given below.

Figure 11:
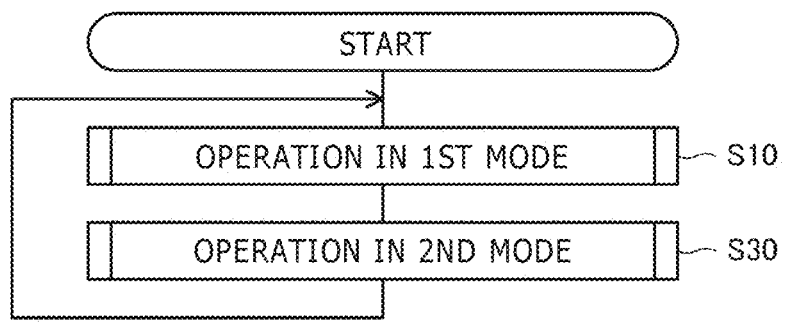
FIG. 11 is a flowchart illustrating processes performed by a control section 90b illustrated in FIG. 10.
Figure 12:
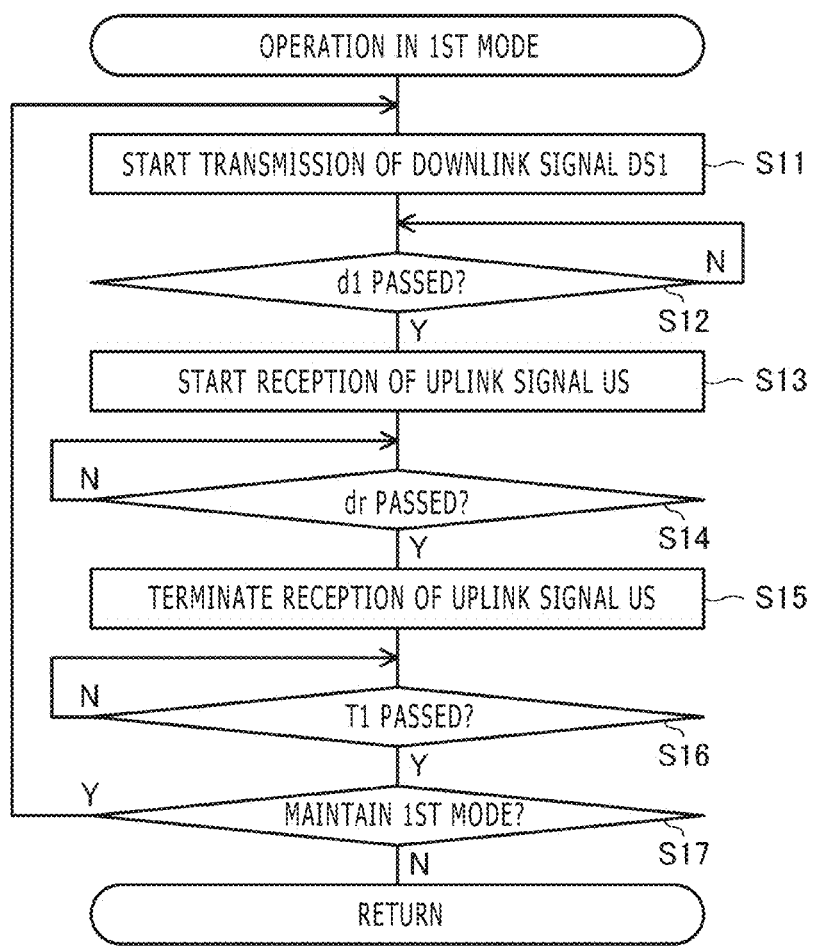
FIG. 12 is a flowchart illustrating in detail operation in a first mode illustrated in FIG. 11.
Figure 13:
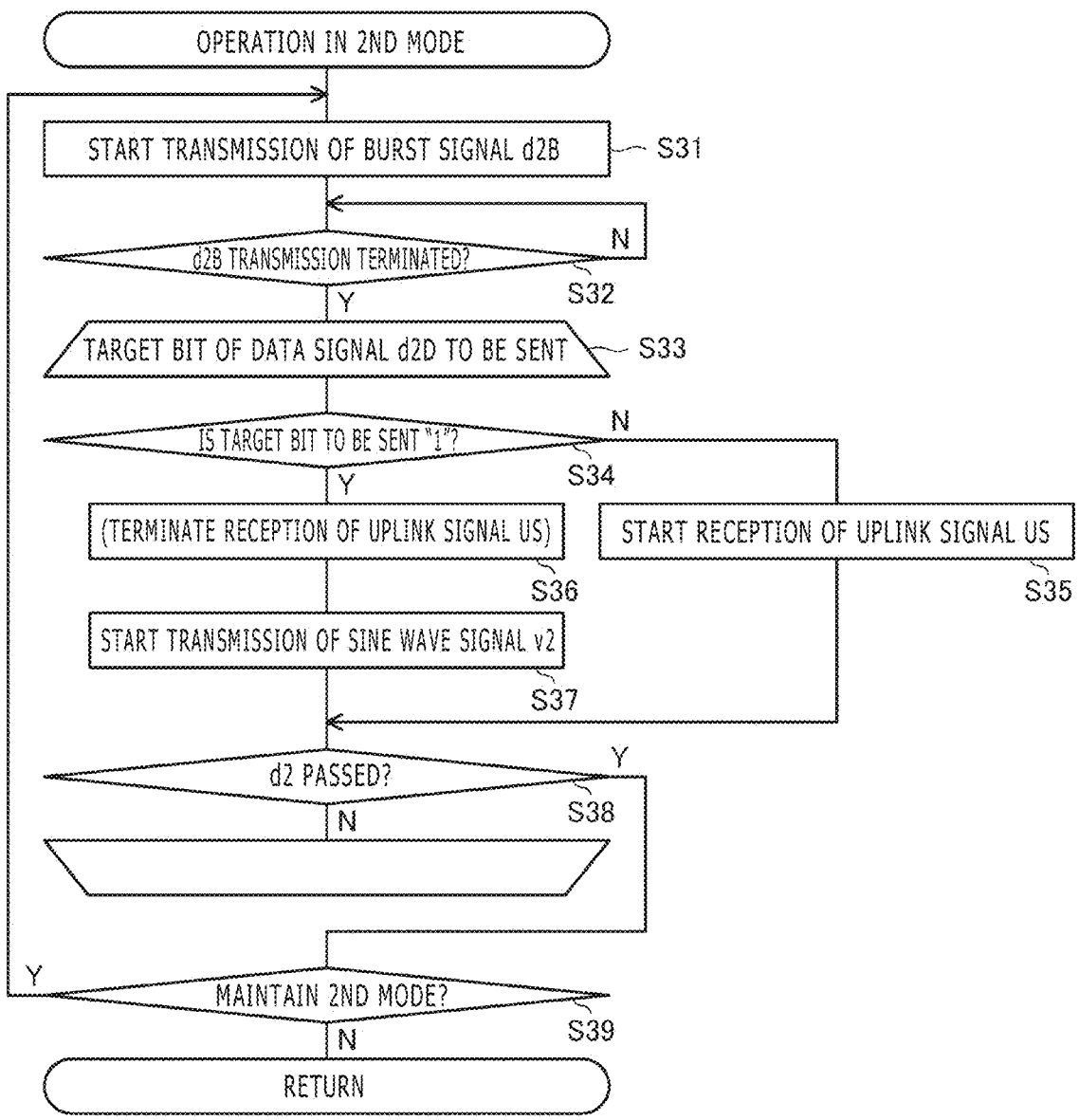
FIG. 13 is a flowchart illustrating in detail operation in a second mode illustrated in FIG. 11.
Figure 14:
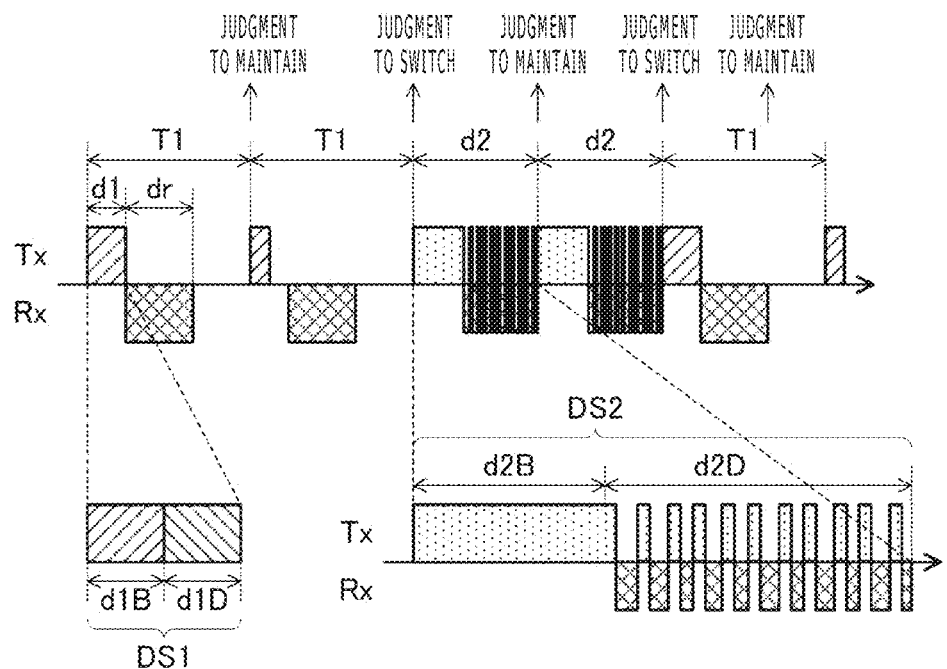
FIG. 14 is a diagram illustrating an example of a signal generated by the control section 90b illustrated in FIG. 10.

FIGS. 11 to 13 are flowcharts illustrating processes performed by the control section 90b. On the other hand, FIG. 14 is a diagram illustrating an example of a signal generated by the control section 90b. It should be noted that the horizontal axis in FIG. 14 indicates time and that the upper side of the horizontal axis indicates the transmission Tx and the lower side thereof indicates the reception Rx. The description will be continued below with reference to these figures.

First, as illustrated in FIG. 14, the control section 90b is configured to send the downlink signal DS1 intermittently at the regular interval T1 (given first interval) illustrated also in FIG. 9. This is operation in the first mode. Speaking more specifically, the control section 90b is configured to send the downlink signal DS1 over the given time d1 that is shorter than the interval T1 from the beginning of each of the intervals T1. Because of the intermittent transmission of the downlink signal DS1 in this manner, there is always a time period during which no transmission operation is conducted within the interval T1. The control section 90b performs detection operation to detect the uplink signal US sent by the position detection device 3 using the electrode 21 by taking advantage of this time period. Then, the control section 90b determines whether or not it is necessary to switch to the second mode in accordance with this detection result. Therefore, the control section 90b makes a determination as to whether or not it is necessary to switch to the second mode at the interval T1.

After having switched to the second mode, the control section 90b is configured to send the downlink signal DS2 intermittently at the regular interval d2 (given second interval). It should be noted that the time length of the interval d2 may be or may not be equal to the given time d2 illustrated in FIG. 9. This intermittent transmission is realized by ensuring that, when the target bit to be sent is "1," the sine wave signal v2 is output from the signal processing section 24, and that when the target bit to be sent is "0," the sine wave signal v2 is not output from the signal processing section 24 when the data signal d2D is sent as described above. Therefore, the intermittent transmission of the downlink signal DS2 is conducted during transmission of the data signal d2D rather than the burst signal d2B as illustrated in FIG. 14. The control section 90b performs the detection operation to detect the uplink signal US sent by the position detection device 3 using the electrode 21 by taking advantage of this time period during which the sine wave signal v2 is not output from the signal processing section 24 thanks to this intermittent transmission. Then, the control section 90b determines at every interval d2 whether or not it is necessary to switch to the first mode in accordance with the detection result.

Referring to the flowchart illustrated in FIG. 11, the control section 90b is configured to execute a subroutine for performing operation in the first mode (step S10) and a subroutine for performing operation in the second mode (step S30) alternately. Although a detailed description will be given with reference to FIGS. 12 and 13, this process differs from the process performed by the control section 90a illustrated in FIG. 8 in that the switching between step S10 and step S30 takes place based on the result of the determination process for switching between the modes conducted during each subroutine rather than in accordance with the passage of time. A detailed description will be given below of the process performed in each of steps S10 and S30.

FIG. 12 is a flowchart illustrating in detail operation in the first mode (step S10 illustrated in FIG. 11). As illustrated in FIG. 12, the control section 90b operating in the first mode starts to send the downlink signal DS1 (including the burst signal d1B and the data signal d1D) first (step S11). Thereafter, the control section 90b monitors the passage of time while, at the same time, sending the downlink signal DS1 (step S12) and starts to receive the uplink signal US (step S13) when the given time d1 elapses. Then, when a given time dr (dr≤T1−d1) elapses (step S14), the control section 90b terminates the reception of the uplink signal US (step S15), waits until the given interval T1 elapses (step S16), and determines whether or not to maintain the first mode (step S17).

Here, as described above, only the type of the position detection device 3 that can receive the downlink signal DS2 has a capability to send the uplink signal US, and the type of the position detection device 3 that cannot receive the downlink signal DS2 has no capability to send the uplink signal US. Therefore, the fact that the uplink signal US is received means that the position detection device 3 capable of receiving the downlink signal DS2 exists near the stylus 2.

For this reason, if the uplink signal US was received during current execution of the subroutine (specifically, from the beginning of the reception of the uplink signal US in step S13 to the end of the reception of the uplink signal US in step S15), the control section 90b determines, in step S17, that the first mode will not be maintained (i.e., will be switched to the second mode) so that the stylus 2 can send the downlink signal DS2. Conversely, if the uplink signal US was not received during current execution of the subroutine, the control section 90b determines that the position detection device 3 capable of receiving the downlink signal DS2 does not exist near the stylus 2 and determines that the first mode will be maintained (i.e., will not be switched to the second mode).

When determining in step S17 that the first mode will be maintained, the control section 90b returns to step S11 and continues with the process. That is, the subroutine in step S10 illustrated in FIG. 11 (operation in the first mode illustrated in FIG. 12) is repeated. On the other hand, when determining in step S17 that the first mode will not be maintained, the control section 90b exits from the subroutine in step S10 and continues with the process. As a result, the subroutine in step S30 illustrated in FIG. 11 (operation in the second mode illustrated in FIG. 13) starts.

FIG. 13 is a flowchart illustrating in detail operation in the second mode (step S30 illustrated in FIG. 11). As illustrated in FIG. 13, the control section 90b operating in the second mode starts to send the burst signal d2B first (step S31). The transmission time of the burst signal d2B is determined in advance, and next, the control section 90b determines whether or not the transmission of the burst signal d2B is complete (step S32) by determining whether or not this predetermined transmission time has expired.

Next, the control section 90b performs a loop process targeted successively for each of the bits to be sent making up the data signal d2D (each bit of the data Res, however, each bit of the Manchester-coded data Res if the data Res is Manchester-coded) (step S33). This loop process is repeated until the interval d2 elapses (step S38).

In the loop process in step S33, the control section 90b determines first whether or not the target bit to be sent is "1" (step S34). In this process, when the target bit to be sent is "0," the control section 90b makes a negative determination. When the data Res to be sent does not exist, the determination result in step S34 is negative as when the target bit to be sent is "0."

When a negative result is obtained in step S34, the control section 90b starts to receive the uplink signal US (step S35). On the other hand, when an affirmative result is obtained in step S34, the control section 90b if engaged in a reception operation to receive the uplink signal US terminates the reception operation (step S36) and then starts to send one-bit worth of the sine wave signal v2 (step S37).

After starting to receive the uplink signal US in step S35 or after starting to send the sine wave signal v2 in step S37, the control section 90b determines whether or not the interval d2 has elapsed (step S38). Then, when determining that the interval d2 has yet to elapse, the control section 90b returns to step S34 and repeats the process on the next target bit to be sent. On the other hand, when determining that the interval d2 has elapsed in step S38, the control section 90b determines whether to exit from the loop process (to return to the first mode) or to repeat the loop process (to maintain the second mode) (step S39).

It is preferred that the determination criterion in step S39 should be the same as that in step S17 illustrated in FIG. 12. That is, it is preferred that if the uplink signal US was received during current execution of the subroutine (more specifically, from the beginning of the reception of the uplink signal US in step S35 to the end of the reception of the uplink signal US in step S36; there are a plurality of these time periods existing in the second mode), the control section 90b should determine that the second mode will be maintained (i.e., will not be switched to the first mode), and that, conversely, if the uplink signal US was not received during current execution of the subroutine, the control section 90b should determine that the second mode will not be maintained (i.e., will be switched to the first mode).

When determining in step S39 that the second mode will be maintained, the control section 90b returns to step S31 and continues with the process. The subroutine in step S30 illustrated in FIG. 11 (operation in the second mode illustrated in FIG. 13) is repeated. On the other hand, when determining in step S39 that the second mode will not be maintained, the control section 90b exits from the subroutine in step S30 and continues with the process. As a result, the subroutine in step S10 illustrated in FIG. 11 (operation in the first mode illustrated in FIG. 12) starts.

As described above, in the configuration and operation of the stylus 2 according to the present embodiment, the stylus 2 determines whether or not it is necessary to switch between the modes, and the operation mode of the stylus 2 is switched in accordance with the result. This makes it possible to select the first mode as the operation mode of the stylus 2 when the stylus 2 is used together with the position detection device 3 that supports only the reception of the downlink signal DS1 and select the second mode as the operation mode of the stylus 2 when the stylus 2 is used together with the position detection device 3 that supports only the reception of the downlink signal DS2. Therefore, it is possible to configure the stylus 2 not to send the downlink signal DS2 when the stylus 2 is used together with the position detection device 3 that supports only the reception of the downlink signal DS1 (position detection device supporting the first method described above) and configure the stylus 2 not to send the downlink signal DS1 when the stylus 2 is used together with the position detection device 3 that supports only the reception of the downlink signal DS2 (position detection device supporting the second method described above). When these position detection devices 3 are used side by side, it is possible to ensure lower power consumption than the stylus 2 that employs the alternate transmission method illustrated in FIG. 4 and eliminate the need to change styluses each time the position detection device 3 is switched from one to the other.

Figure 15:
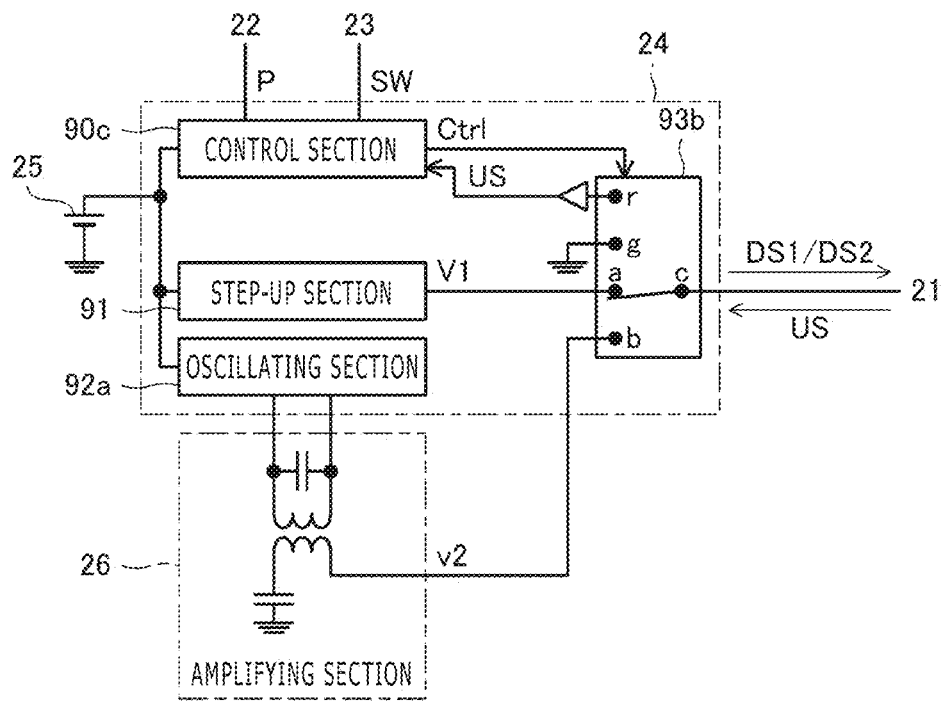
FIG. 15 is a diagram illustrating a configuration of the stylus 2 according to a second embodiment of the present invention.

Next, FIG. 15 is a diagram illustrating a configuration of the stylus 2 according to the second embodiment of the present invention. The stylus 2 illustrated in FIG. 15 differs from the stylus 2 illustrated in FIG. 10 in that it has a control section 90c in place of the control section 90b. The stylus 2 illustrated in FIG. 15 is the same as the stylus 2 illustrated in FIG. 10 in all other respects, and the same components will be denoted by the same reference symbols, and a description will be given with focus on the differences.

The control section 90c differs from the control section 90b in processes in the second mode and is the same as the control section 90b in all other respects. Specifically, the control section 90c is configured to determine whether or not the stylus 2 is being used (e.g., in contact with the touch surface 3a) during operation in the second mode, and perform a reception operation to receive the uplink signal US only when determining that the stylus is not being used. The control section 90c is configured not to perform the reception operation to receive the uplink signal US when determining that the stylus is being used. A specific description will be given below.

Figure 16:
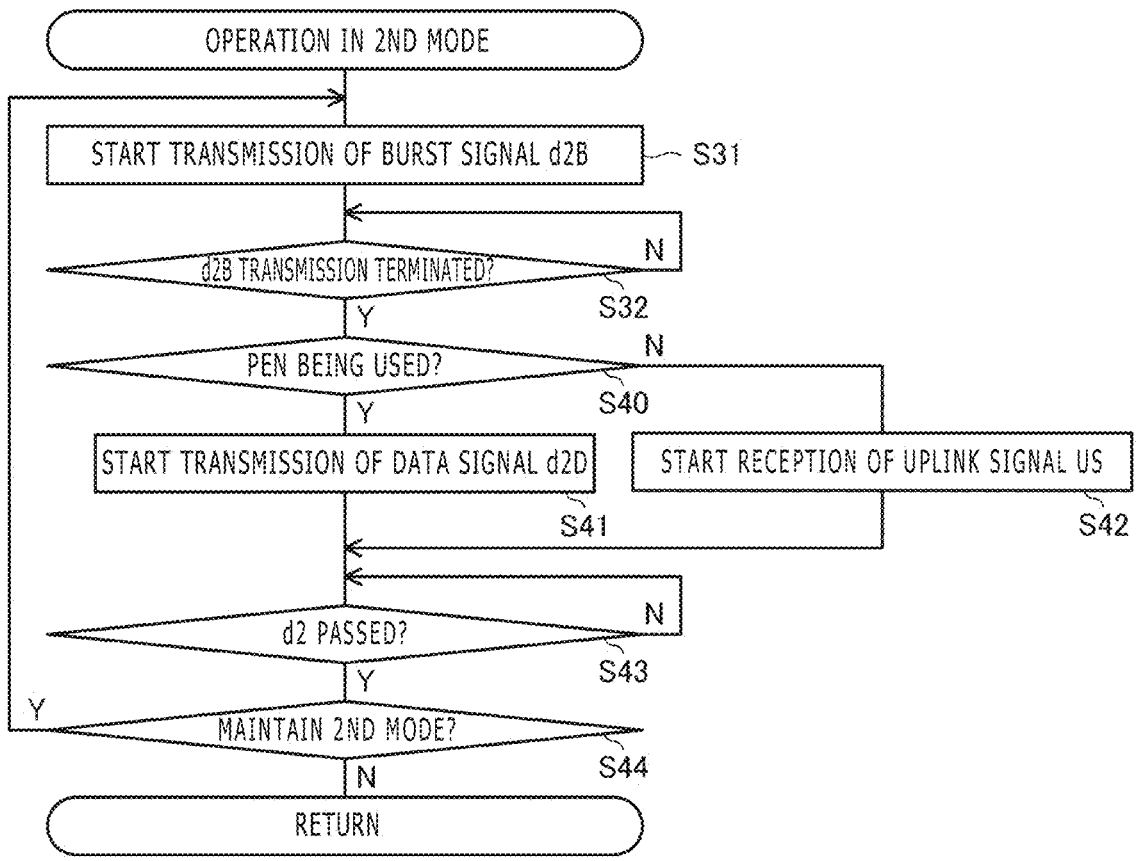
FIG. 16 is a flowchart illustrating in detail operation in the second mode handled by a control section 90c illustrated in FIG. 15.
Figure 17:
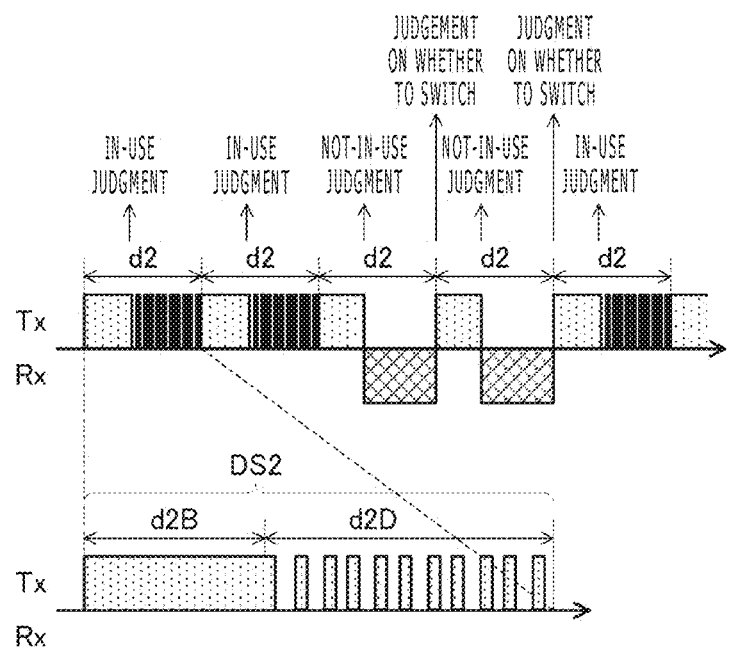
FIG. 17 is a diagram illustrating an example of a signal generated by the control section 90c illustrated in FIG. 15.

FIG. 16 is a flowchart illustrating in detail operation in the second mode handled by the control section 90c. On the other hand, FIG. 17 is a diagram illustrating an example of a signal generated by the control section 90c. It should be noted that the horizontal axis in FIG. 17 indicates time and that the upper side of the horizontal axis indicates the transmission Tx and the lower side thereof indicates the reception Rx. The description will be continued below with reference to these figures.

As illustrated in FIG. 16, the control section 90c performs the processes in steps S31 and S32 as does the control section 90b (refer to FIG. 13). Thereafter, the control section 90c determines whether or not the stylus 2 is being used (step S40). This determination is made, for example, based on whether or not the pen pressure level P is larger than 0. That is, it may determine that the stylus 2 is being used when the pen pressure level P is larger than 0 because there is a high probability that the stylus 2 is in contact with the touch surface 3a and may determine that the stylus 2 is not being used when the pen pressure level P is 0 or less because there is a high probability that the stylus 2 is out of contact with the touch surface 3a. Also, the control section 90c may determine that the stylus 2 is being used when the switch information SW is ON. In this case, whether or not the stylus 2 is being used can be determined based on the user's intention.

When determining that the stylus 2 is being used in step S40, the control section 90c starts to send the data signal d2D (step S41). This transmission is intermittent as illustrated in FIG. 17 when the target bit to be sent is "0" as described above because the sine wave signal v2 is not output from the signal processing section 24. Although the control section 90b in FIG. 10 performs the reception operation to receive the uplink signal US by taking advantage of time periods in-between these intermittent transmissions, the control section 90c in FIG. 15 does not perform such a reception operation. This is because it was determined in step S40 that the stylus 2 is being used, and thus it is likely that the stylus 2 continues to be located near the position detection device 3 capable of receiving the downlink signal DS2 and that there is no need to switch to the first mode.

When determining that the stylus 2 is not being used in step S40, on the other hand, the control section 90c starts to receive the uplink signal US (step S42). The reception operation in this case is continuous as also illustrated in FIG. 17. The continuous reception operation is possible because there is no need to send the data signal d2D when the stylus 2 is not being used and thus the data signal d2D is not sent.

Thereafter, the control section 90c continues with the transmission of the data signal d2D or the reception of the uplink signal US until the interval d2 elapses (step S43) and determines whether or not to maintain the second mode when determining that the interval d2 has elapsed in step S43 (step S44).

In the determination in step S44, the control section 90c makes an unconditional determination to the effect that the second mode will be maintained when the reception operation in step S42 is not performed (i.e., when the control section 90c determines in step S40 that the stylus 2 is being used). In this case, therefore, step S44 can be omitted. When the reception operation in step S42 is performed, on the other hand, the control section 90c determines whether or not to maintain the second mode based on the same determination criterion as for step S39 illustrated in FIG. 13.

When determining in step S44 that the second mode will be maintained, the control section 90c returns to step S31 and continues with the process. As a result, the subroutine in step S30 illustrated in FIG. 11 (operation in the second mode illustrated in FIG. 16) is repeated. When determining in step S44 that the second mode will not be maintained, on the other hand, the control section 90c exits from the subroutine in step S30 and continues with the process. As a result, the subroutine in step S10 illustrated in FIG. 11 (operation in the first mode illustrated in FIG. 12) starts.

As described above, the configuration and operation of the stylus 2 according to the present embodiment makes it possible to obtain an effect of continuously receiving the uplink signal US for a longer period of time than in the first embodiment in addition to the same effect as with the stylus 2 according to the first embodiment. This makes it possible to receive the uplink signal US with higher accuracy than in the first embodiment.

Figure 18:
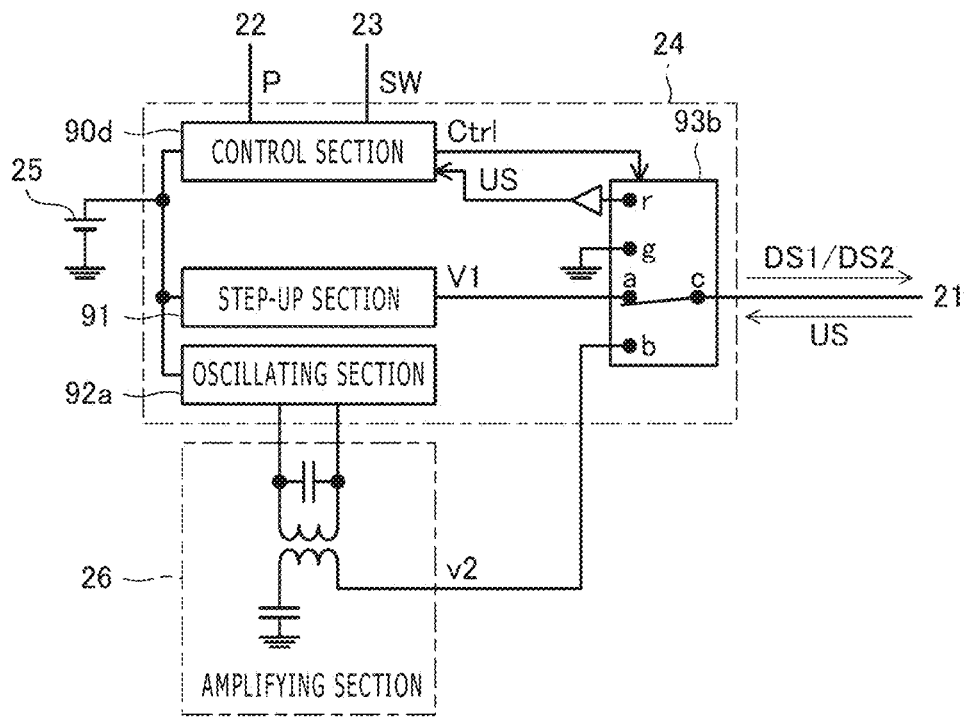
FIG. 18 is a diagram illustrating a configuration of the stylus 2 according to a third embodiment of the present invention.

Next, FIG. 18 is a diagram illustrating a configuration of the stylus 2 according to the third embodiment of the present invention. The stylus 2 illustrated in FIG. 18 differs from the stylus 2 illustrated in FIG. 10 in that it has a control section 90d in place of the control section 90b. The stylus 2 illustrated in FIG. 18 is the same as the stylus 2 illustrated in FIG. 10 in all other respects, and the same components will be denoted by the same reference symbols, and a description will be given with focus on the differences.

The control section 90d differs from the control section 90b in that it determines whether or not it is necessary to switch to the first or second mode based on user operation accepted by the switch 23 illustrated in FIG. 1 rather than based on whether or not the uplink signal US has been received. The control section 90d is the same as the control section 90b in all other respects. A specific description will be given below.

Figure 19:
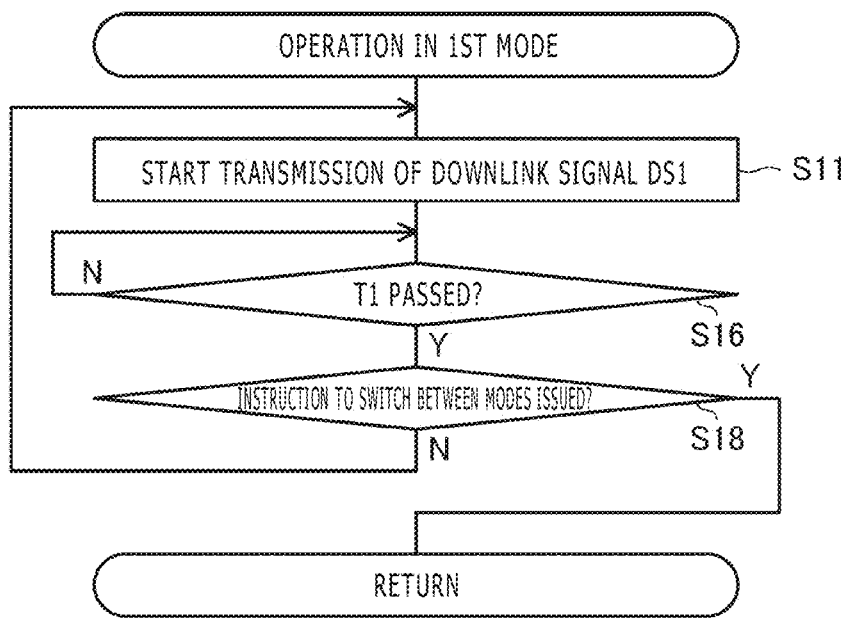
FIG. 19 is a flowchart illustrating in detail operation in the first mode handled by a control section 90*d* illustrated in FIG. 18.
Figure 20:
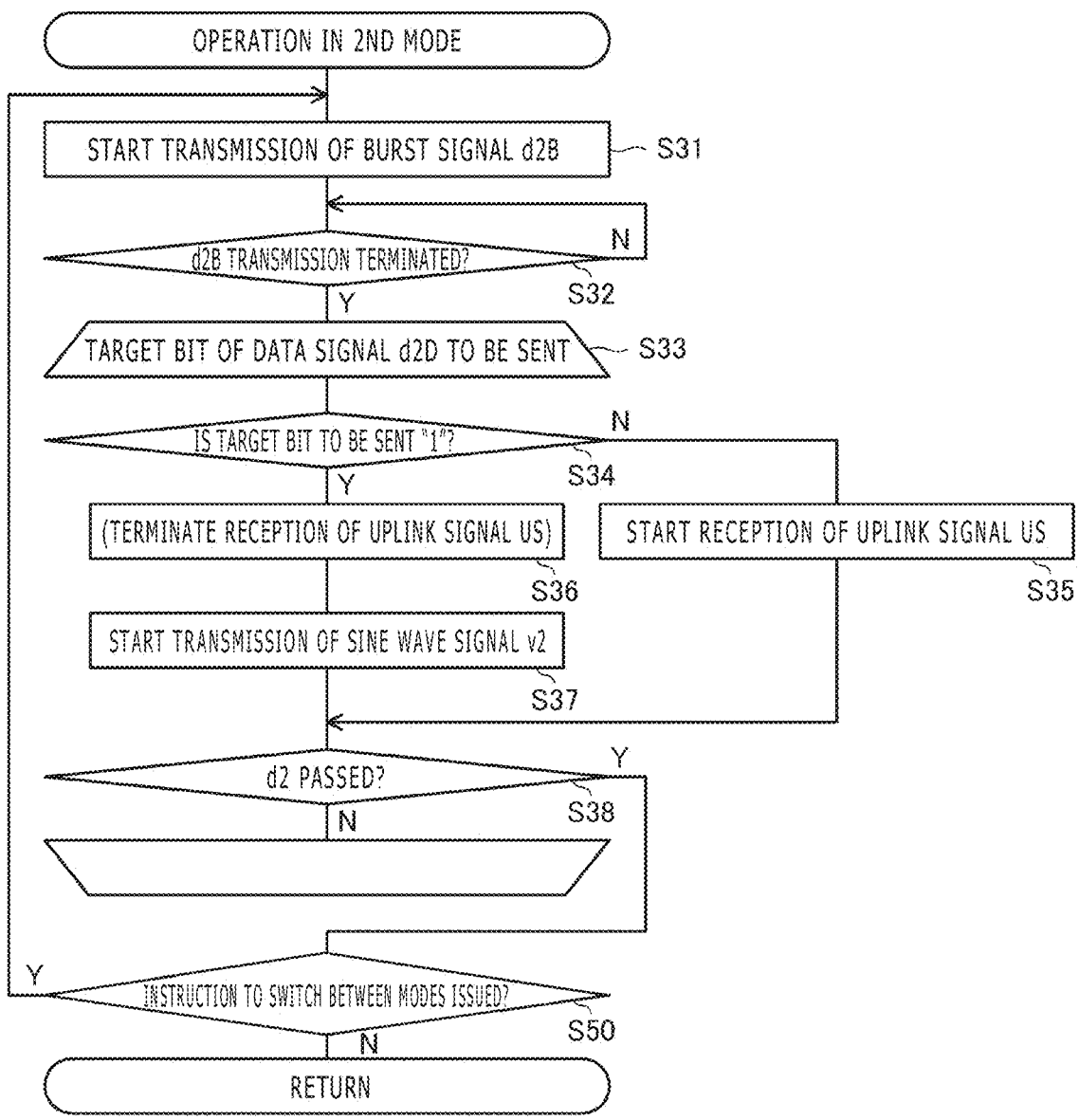
FIG. 20 is a flowchart illustrating in detail operation in the second mode handled by the control section 90*d* illustrated in FIG. 18.
Figure 21:
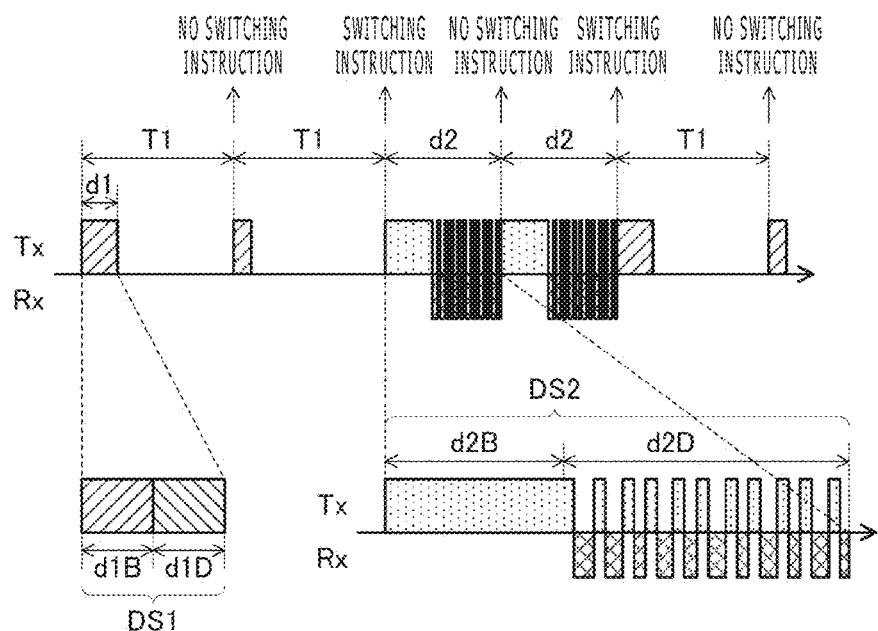
FIG. 21 is a diagram illustrating an example of a signal generated by the control section 90*d* illustrated in FIG. 18.

FIGS. 19 and 20 are flowcharts illustrating processes performed by the control section 90d. On the other hand, FIG. 21 is a diagram illustrating an example of a signal generated by the control section 90d. It should be noted that the horizontal axis in FIG. 21 indicates time and that the upper side of the horizontal axis indicates the transmission Tx and the lower side thereof indicates the reception Rx. The description will be continued below with reference to these figures.

FIG. 19 is a flowchart illustrating in detail operation in the first mode (step S10 illustrated in FIG. 11). As illustrated in FIG. 19, the control section 90d operating in the first mode performs the process in step S11 first as does the control section 90b (refer to FIG. 12). Thereafter, the control section 90d waits until the given interval T1 elapses without performing the processes in steps S12 to S15 illustrated in FIG. 12 (step S16). Because the processes in steps S12 to S15 are not performed, the control section 90d does not receive the uplink signal US during operation in the first mode as illustrated also in FIG. 21. When the interval T1 elapses, the control section 90d determines, based on the switch information SW, whether or not the user issued an instruction to switch between the modes (step S18). In other words, the control section 90d determines whether or not it is necessary to switch to the second mode.

When determining in step S18 that the user issued no instruction to switch between the modes, the control section 90d returns to step S11 and continues with the process. As a result, the subroutine in step S10 illustrated in FIG. 11 (operation in the first mode illustrated in FIG. 19) is repeated. When determining in step S18 that the user issued an instruction to switch between the modes, on the other hand, the control section 90d exits from the subroutine in step S10 and continues with the process. As a result, the subroutine in step S30 illustrated in FIG. 11 (operation in the second mode illustrated in FIG. 20) starts.

FIG. 20 is a flowchart illustrating in detail operation in the second mode (step S30 illustrated in FIG. 11). As illustrated in FIG. 20, the control section 90d operating in the second mode performs the processes in steps S31 to S38 first as does the control section 90b (refer to FIG. 13). Therefore, the transmission and reception of each signal in the second mode is conducted in the same manner as in the first embodiment, as illustrated in FIG. 21. Thereafter, the control section 90d performs a process of determining, based on the switch information SW, whether or not the user issued an instruction to switch between the modes (step S50) rather than the determination process in step S 39 illustrated in FIG. 13. In other words, the control section 90d determines whether or not it is necessary to switch to the first mode.

When determining, in step S50, that the user issued no instruction to switch between the modes, the control section 90d returns to step S31 and continues with the process. As a result, the subroutine in step S30 illustrated in FIG. 11 (operation in the second mode illustrated in FIG. 20) is repeated. When determining in step S50 that the user issued an instruction to switch between the modes, on the other hand, the control section 90d exits from the subroutine in step S30 and continues with the process. As a result, the subroutine in step S10 illustrated in FIG. 11 (operation in the first mode illustrated in FIG. 19) starts.

As described above, the configuration and operation of the stylus 2 according to the present embodiment allows for switching between the first mode and the second mode based on user's explicit instruction. Therefore, when the position detection device 3 supporting only the reception of the downlink signal DS1 and the position detection device 3 supporting only the reception of the downlink signal DS2 are used side by side as in the first and second embodiments, it is possible to ensure lower power consumption than the stylus 2 that employs the alternate transmission method illustrated in FIG. 4 and eliminate the need to change (switch) styluses each time the position detection device 3 is switched from one to the other.

It should be noted that although, in the present embodiment, the processes of the control section 90d were configured by modifying step S39 of the processes of the control section 90b illustrated in FIG. 13, it is possible to configure the processes of the control section 90d by modifying step S44 of the processes of the control section 90c illustrated in FIG. 16 in the same manner. In this case, it is also possible to obtain an effect of permitting the reception of the uplink signal US with higher accuracy than in the first embodiment as in the second embodiment.

Figure 22:
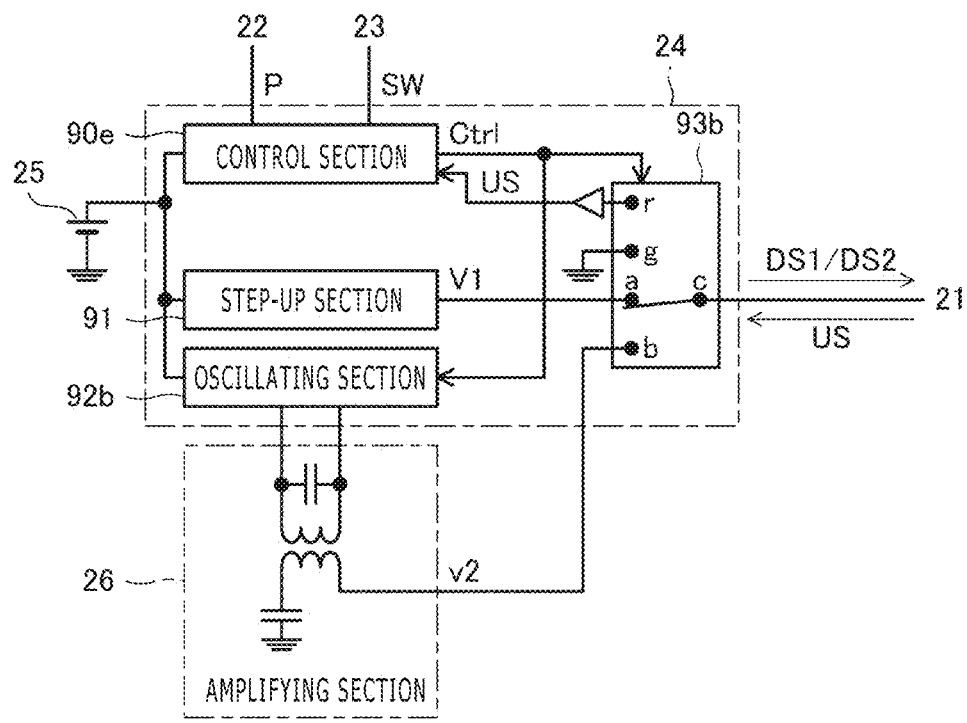
FIG. 22 is a diagram illustrating a configuration of the stylus 2 according to a fourth embodiment of the present invention.

Next, FIG. 22 is a diagram illustrating a configuration of the stylus 2 according to the fourth embodiment of the present invention. The stylus 2 illustrated in FIG. 22 differs from the stylus 2 illustrated in FIG. 10 in that it has a control section 90e and an oscillating section 92b in place of the control section 90b and the oscillating section 92a. The stylus 2 illustrated in FIG. 22 is the same as the stylus 2 illustrated in FIG. 10 in all other respects, and the same components will be denoted by the same reference symbols, and a description will be given with focus on the differences.

When generating the data signal d2D making up the downlink signal DS2, while keeping the switch section 93b switched to the terminal 'b,' the control section 90e controls the oscillating state of the oscillating section 92b (rather than controlling the switching of the switch section 93a) in accordance with the data Res such as the pen pressure level P and the switch information SW. Specifically, the control section 90e puts the oscillating section 92b into an oscillating state when the target bit to be sent is "1" and puts the oscillating section 92b into a non-oscillating state when the target bit to be sent is "0." Also, when generating the burst signal d2B, the control section 90e keeps the switch section 93b switched to the terminal 'b' and keeps the oscillating section 92b in an oscillating state.

As described above, the configuration and operation of the stylus 2 according to the present embodiment also makes it possible to send the downlink signal DS2 from the stylus 2 as with the stylus 2 according to the first embodiment. The stylus 2 according to the present embodiment is the same as the stylus 2 according to the first embodiment in all other respects. Therefore, when the position detection device 3 supporting only the reception of the downlink signal DS1 and the position detection device 3 supporting only the reception of the downlink signal DS2 are used side by side as in the first embodiment, the configuration and operation of the stylus 2 according to the present embodiment also makes it possible to ensure lower power consumption than the stylus 2 that employs the alternate transmission method illustrated in FIG. 4 and eliminate the need to change styluses each time the position detection device 3 is switched from one to the other.

It should be noted that the downlink signal DS2 may be generated not only by the stylus 2 according to the first embodiment but also by the styluses 2 according to the second and third embodiments.

Figure 23:
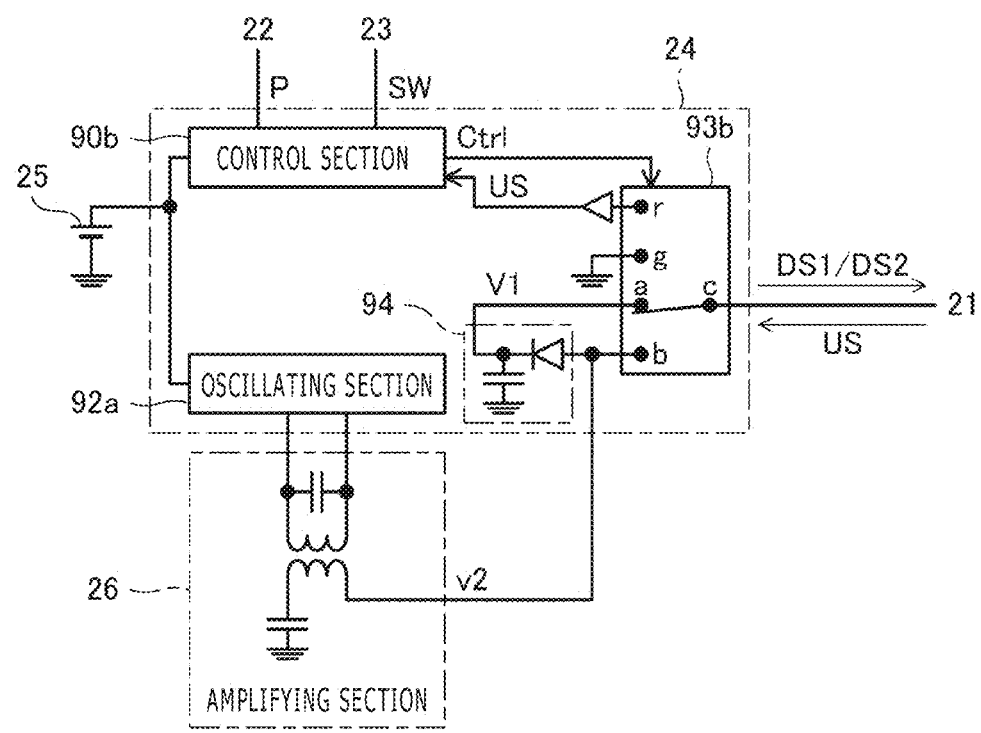
FIG. 23 is a diagram illustrating a configuration of the stylus 2 according to a fifth embodiment of the present invention.

Next, FIG. 23 is a diagram illustrating a configuration of the stylus 2 according to the fifth embodiment of the present invention. The stylus 2 illustrated in FIG. 23 differs from the stylus 2 illustrated in FIG. 10 in that it has a rectifying section 94 in place of the step-up section 91. The stylus 2 illustrated in FIG. 23 is the same as the stylus 2 illustrated in FIG. 10 in all other respects, and the same components will be denoted by the same reference symbols, and a description will be given with focus on the differences.

The rectifying section 94 is a circuit that generates the DC voltage V1 by rectifying the sine wave signal v2 output from the amplifying section 26 using diodes and a capacitor. The DC voltage V1 generated by the rectifying section 94 is supplied to the terminal 'a' of the switch section 93b.

As described above, the configuration and operation of the stylus 2 according to the present embodiment also makes it possible to send the downlink signal DS1 from the stylus 2 as with the stylus 2 according to the first embodiment. The stylus 2 according to the present embodiment is the same as the stylus 2 according to the first embodiment in all other respects. Therefore, when the position detection device 3 supporting only the reception of the downlink signal DS1 and the position detection device 3 supporting only the reception of the downlink signal DS2 are used side by side as in the first embodiment, the configuration and operation of the stylus 2 according to the present embodiment also makes it possible to ensure lower power consumption than the stylus 2 that employs the alternate transmission method illustrated in FIG. 4 and eliminate the need to change styluses each time the position detection device 3 is switched from one to the other.

Also, the configuration of the stylus 2 according to the present embodiment eliminates the need for the step-up section 91 and, therefore, can simplify the configuration of the signal processing section 24.

It should be noted that the same DC voltage V1 as in the present embodiment may be generated not only by the stylus 2 according to the first embodiment but also by the styluses 2 according to the second to fourth embodiments. It should be noted, however, that if the generation of the DC voltage V1 is applied to the stylus 2 according to the fourth embodiment, it is necessary to put the oscillating section 92*b* into an oscillating state when the downlink signal DS1 is sent.

Although preferred embodiments of the present invention have been described above, the present invention is not limited by these embodiments, and the present invention can be carried out in various forms without departing from the disclosure of the present invention.

For example, when the stylus 2 determines whether to switch between the modes based on whether or not the uplink signal US was received in the above embodiments, the details of the uplink signal US were not considered. However, the stylus 2 may determine whether or not to switch between the modes based on the details of the uplink signal US. In this case, it becomes possible to switch between the modes of the stylus 2 by an explicit instruction from the sensor controller 31.

Also, in each of the above embodiments, although the uplink signal US was a signal that included the detection pattern c1, the delimiting pattern STP, and the control information c2, the present invention is suitably applicable to a case in which the uplink signal US is a simple trigger signal.

DESCRIPTION OF REFERENCE SYMBOLS

1 Position detection system
2 Stylus
3, 3A, 3B Position detection device
3*a* Touch surface
5 Access point
20 core body
21 Electrode
22 Pen pressure detector
23 Switch
24 Signal processing section
25 Power supply
26 Amplifying section
30 Sensor
30X, 30Y Linear electrode
31 Sensor controller
32 System controller
40 Selecting section
41*x*, 41*y* Conductor selection circuit
44*x*, 44*y* Switch
50 Receiving section
51 Amplifying circuit
52 Detecting circuit
53 Analog-digital converter
60 Transmitting section
61 Pattern supply section
62 Switch
63 Spreading process section
64 Code sequence holding section
65 Transmission guard section
70 Logic section
90*a* to 90*e* Control section
91 Step-up section
92*a*, 92*b* Oscillating section
93*a*, 93*b* Switch section
94 Rectifying section
Ctrl Control signal
d1B Burst signal
d1D Data signal
d2B Burst signal
d2D Data signal
DS1, DS2 Downlink signal
P Pen pressure level
Res Data
STP Delimiting pattern
SW Switch information
US Uplink signal
V1 DC voltage
v2 Sine wave signal

The invention claimed is:

1. An active stylus, comprising:
   at least one electrode;
   a pen pressure detector; and
   an integrated circuit coupled to the at least one electrode and the pen pressure detector, and configured to:
   per a regular interval:
      determine whether the active stylus is in use based on the pen pressure detector detecting that a pen tip of the active stylus is in contact with a sensor panel;
      using a remaining time of the regular interval in which the active stylus is determined to be in use, transmit a first downlink signal indicative of a pen pressure value of the pen tip to the sensor panel; and
      using a remaining time of the regular interval in which the active stylus is determined to be not in use based on the pen pressure detector not detecting that the pen tip is in contact with the sensor panel, receive an uplink signal transmitted from the sensor panel, wherein during said remaining time of the regular interval in which the active stylus is determined to be not in use, the first downlink signal is not transmitted to the sensor panel.

2. The active stylus of claim 1, wherein the integrated circuit is configured to:
   continue transmitting the first downlink signal indicative of the pen pressure value of the pen tip as long as the pen tip remains in contact with the sensor panel.

3. The active stylus of claim 1, wherein the pen pressure value is a multiple bit value formed of multiple bits, and the remaining time of the regular interval during which the uplink signal is received corresponds to a time length of the multiple bit value.

4. The active stylus of claim 1, wherein the integrated circuit is configured to:
   responsive to receiving the uplink signal transmitted from the sensor panel, transmits a second downlink signal in response to the uplink signal.

5. The active stylus of claim 4, wherein a modulation method of the first downlink signal is different from a modulation method of the second downlink signal.

6. The active stylus of claim 5, wherein,
   the modulation method of the first downlink signal modulates a pulse signal with the pen pressure value, and
   the modulation method of the second downlink signal modulates a carrier signal with downlink data.

7. A stylus integrated circuit, for use within an active stylus, the active stylus including at least one electrode and a pen pressure detector, the stylus integrated circuit comprising:
- a memory; and
- a processor coupled to the memory and configured to:
  - per a regular interval:
    - determine whether the active stylus is in use based on the pen pressure detector detecting that a pen tip of the active stylus is in contact with a sensor panel;
    - using a remaining time of the regular interval in which the active stylus is determined to be in use, control transmission of a first downlink signal indicative of a pen pressure value of the pen tip from the active stylus to the sensor panel; and
    - using a remaining time of the regular interval in which the active stylus is determined to be not in use based on the pen pressure detector not detecting that the pen tip is in contact with the sensor panel, control reception of an uplink signal transmitted from the sensor panel, wherein during said remaining time of the regular interval in which the active stylus is determined to be not in use, the first downlink signal is not transmitted to the sensor panel.

8. The stylus integrated circuit of claim 7, wherein the processor is configure to:
- continue controlling the transmission of the first downlink signal indicative of the pen pressure value of the pen tip as long as the pen tip remains in contact with the sensor panel.

9. The stylus integrated circuit of claim 7, wherein the pen pressure value is a multiple bit value formed of multiple bits, and the remaining time of the regular interval during which the uplink signal is received corresponds to a time length of the multiple bit value.

10. The stylus integrated circuit of claim 7, wherein the processor is configure to:
- responsive to receiving the uplink signal transmitted from the sensor panel, transmit a second downlink signal in response to the uplink signal.

11. The stylus integrated circuit of claim 10, wherein a modulation method of the first downlink signal is different from a modulation method of the second downlink signal.

12. The stylus integrated circuit of claim 11, wherein,
- the modulation method of the first downlink signal modulates a pulse signal with the pen pressure value, and
- the modulation method of the second downlink signal modulates a carrier signal with downlink data.

13. A method performed by an active stylus, comprising:
- per a regular interval:
  - determining whether the active stylus is in use based on a pen pressure detector detecting that a pen tip of the active stylus is in contact with a sensor panel;
  - using remaining time of the regular interval in which the active stylus is determined to be in use, transmitting a first downlink signal indicative of a pen pressure value of the pen tip to the sensor panel; and
  - using a remaining time of the regular interval in which the active stylus is determined to be not in use based on the pen pressure detector not detecting that the pen tip is in contact with the sensor panel, receiving an uplink signal transmitted from the sensor panel, wherein during said remaining time of the regular interval in which the active stylus is determined to be not in use, the first downlink signal is not transmitted to the sensor panel.

14. The method of claim 13, comprising:
- continuing transmitting the first downlink signal indicative of the pen pressure value of the pen tip as long as the pen tip remains in contact with the sensor panel.

15. The method of claim 13, wherein the pen pressure value is a multiple bit value formed of multiple bits, and the remaining time of the regular interval during which the uplink signal is received corresponds to a time length of the multiple bit value.

16. The method of claim 13, comprising:
- responsive to receiving the uplink signal transmitted from the sensor panel, transmitting a second downlink signal in response to the uplink signal.

17. The method of claim 16, wherein a modulation method of the first downlink signal is different from a modulation method of the second downlink signal.

18. The method of claim 17, wherein,
- the modulation method of the first downlink signal modulates a pulse signal with the pen pressure value, and
- the modulation method of the second downlink signal modulates a carrier signal with downlink data.

* * * * *